US012764160B2

(12) United States Patent
Lancioni et al.

(10) Patent No.: US 12,764,160 B2
(45) Date of Patent: Oct. 13, 2026

(54) SYSTEMS, METHODS, APPARATUS, AND ARTICLES OF MANUFACTURE TO CLASSIFY DATA VIA TIERED MACHINE LEARNING ANALYSIS

(71) Applicant: McAfee, LLC, San Jose, CA (US)

(72) Inventors: German Lancioni, San Jose, CA (US); Steven Leonard Grobman, Flower Mound, TX (US); Oliver Devane, Upton (GB)

(73) Assignee: McAfee, LLC, San Jose, CA (US)

( * ) Notice: Subject to any disclaimer, the term of this patent is extended or adjusted under 35 U.S.C. 154(b) by 79 days.

(21) Appl. No.: 18/910,998

(22) Filed: Oct. 9, 2024

(65) Prior Publication Data

US 2026/0100969 A1 Apr. 9, 2026

(51) Int. Cl.
*H04L 9/40* (2022.01)
*G06F 16/951* (2019.01)

(52) U.S. Cl.
CPC ........ *H04L 63/1483* (2013.01); *G06F 16/951* (2019.01); *H04L 63/1425* (2013.01); *H04L 63/145* (2013.01)

(58) Field of Classification Search
None
See application file for complete search history.

(56) References Cited

U.S. PATENT DOCUMENTS 11,201,875 B2 * 12/2021 Morgan .............. H04L 63/1416
11,418,526 B2 * 8/2022 Bertiger .................. H04L 63/14
11,556,636 B2 * 1/2023 Neil ...................... G06F 21/577
11,595,437 B1 * 2/2023 Mushtaq ................ H04L 63/20
11,722,520 B2 * 8/2023 Hallaji .................... H04L 63/10 726/26
11,973,785 B1 * 4/2024 Alothman ........... H04L 63/1425
12,457,237 B2 * 10/2025 Melicher ............. H04L 63/1416
12,519,830 B2 * 1/2026 Mon Divakaran .......................... H04L 63/1483
12,520,154 B2 * 1/2026 Saha .................. G06F 9/45558

(Continued)

OTHER PUBLICATIONS

Wikipedia, "Homomorphic encryption," retrieved from https://en.wikipedia.org/w/index.php?title=Homomorphic_encryption&oldid=1241079650 on Aug. 22, 2024, 15 pages.

(Continued)

*Primary Examiner* — Khang Do
(74) *Attorney, Agent, or Firm* — Hanley, Flight & Zimmerman, LLC

(57) ABSTRACT

Systems, apparatus, articles of manufacture, and methods are disclosed to classify data via tiered machine learning analysis. An example apparatus includes interface circuitry to access a latent space representation (LSR) of a first sample of a webpage, machine-readable instructions, and at least one processor circuit to be programmed by the machine-readable instructions. For example, the at least one processor circuit is to initiate a first artificial intelligence (AI) model to classify the webpage as benign or potentially malicious based on the LSR. Additionally, the at least one processor circuit is to, after the first AI model classifies the webpage as potentially malicious, initiate a second AI model to classify the webpage as benign or malicious based on a second sample of the webpage, the first AI model being less precise than the second AI model.

20 Claims, 11 Drawing Sheets

(56) References Cited

U.S. PATENT DOCUMENTS

2014/0033307 A1* 1/2014 Schmidtler ......... H04L 63/1483 726/22
2015/0193696 A1* 7/2015 Vasseur ............... H04L 63/1425 706/12
2017/0026390 A1* 1/2017 Sofka .................. H04L 63/1416
2018/0191777 A1* 7/2018 Volkov .................... G06F 21/51
2020/0007559 A1* 1/2020 Morgan .............. H04L 63/1483
2021/0092130 A1* 3/2021 Li ......................... G06F 21/563
2021/0099474 A1* 4/2021 Huang ................... G06N 3/088
2021/0105289 A1* 4/2021 Desai .................. H04L 63/0227
2023/0007024 A1* 1/2023 Maria Vega ........ H04L 63/1441
2023/0185953 A1* 6/2023 Weggenmann ........ G06N 3/088 706/16
2023/0254338 A1* 8/2023 Melicher ............... G06F 16/951 726/13
2023/0422039 A1* 12/2023 Saha ................... G06F 9/45558
2024/0015180 A1* 1/2024 Locar .................. H04L 63/1483
2024/0333730 A1* 10/2024 Wang .................... G06F 16/951
2024/0356967 A1* 10/2024 Costa .................. H04L 63/1483
2025/0119452 A1* 4/2025 Mon Divakaran .......................... H04L 63/1483
2025/0254495 A1* 8/2025 Williams ............. A61B 5/0022
2025/0323943 A1* 10/2025 Danino ................. G06T 1/0021
2025/0337758 A1* 10/2025 Hu ........................... G06N 3/08
2025/0337763 A1* 10/2025 Smith ................. H04L 63/1416
2025/0358300 A1* 11/2025 Mohamed Nabeel ....................... H04L 63/1425
2025/0358315 A1* 11/2025 Ritz ................. G06V 30/19173
2025/0378310 A1* 12/2025 Khatri ...................... G06F 18/23
2026/0012465 A1* 1/2026 Sivajothi ............. H04L 63/1416
2026/0100969 A1* 4/2026 Lancioni ............. H04L 63/1483

OTHER PUBLICATIONS

Wikipedia, “Latent space,” retrieved from https://en.wikipedia.org/w/index.php?title=Latent_space&oldid=1237812611 on Aug. 22, 2024, 4 pages.

* cited by examiner

202

204

206

302

304

SYSTEMS, METHODS, APPARATUS, AND ARTICLES OF MANUFACTURE TO CLASSIFY DATA VIA TIERED MACHINE LEARNING ANALYSIS

FIELD OF THE DISCLOSURE

This disclosure relates generally to cybersecurity and, more particularly, to systems, methods, apparatus, and articles of manufacture to classify data via tiered machine learning analysis.

BACKGROUND

Artificial intelligence (AI) and/or machine learning (ML) provide helpful tools for solving complex problems in a variety of applications. AI and/or ML have been applied in many fields such as Internet and electronic commerce (e-commerce), gaming, finance and economics, agriculture, cybersecurity, education, and media.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
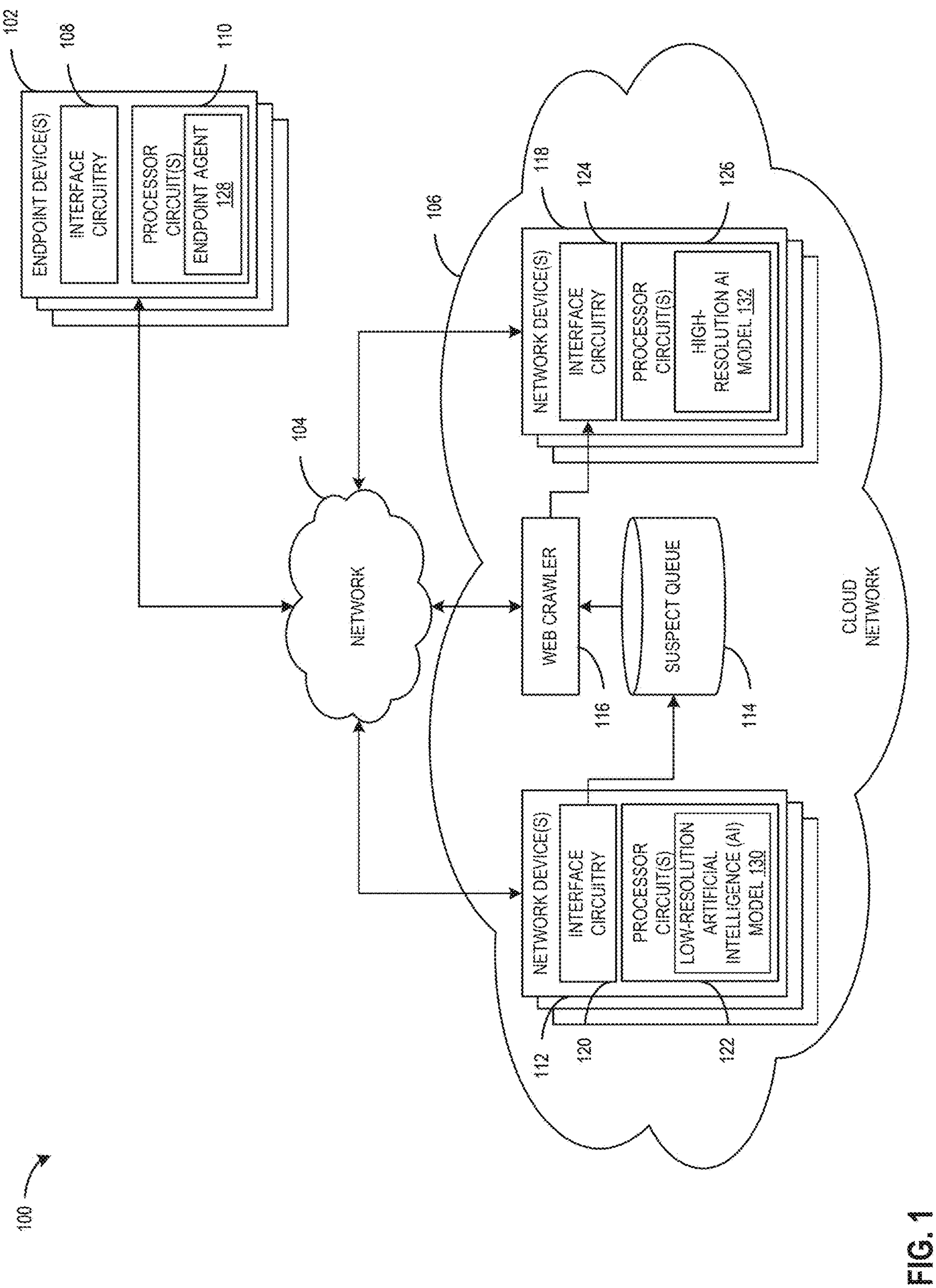
FIG. 1 is a block diagram of an example system to classify data accessed by one or more example endpoint devices as benign or malicious.

AI, including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what the AI learned from the training (e.g., by executing the model to apply the learned patterns and/or associations to the live data). In some examples, input data undergoes preprocessing before being used as an input to the machine learning model. Moreover, in some examples, the output data may undergo postprocessing after being generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

While AI provides helpful tools for solving complex problems in a variety of applications, AI has significant costs and challenges. For example, when creating and deploying an AI model for commercial applications, there is a trade-off between precision and/or accuracy of the AI model and other factors such as cost and/or scalability, privacy, performance impact, and updateability. Updateability refers to the ability to update an AI model.

When an AI model is deployed in the cloud, the lifecycle of the AI model can be easily controlled. For example, cloud resources may be updated without interfering with an end-user experience of one or more services provided via the cloud resources. As such, if an AI model is misbehaving (e.g., operating erratically or unexpectedly), a developer of the AI model can update the AI model on the fly without interfering with an end-user experience. Conversely, if the AI model is deployed on an endpoint device (e.g., an edge device), then the lifecycle of the AI model is dependent on the update cycle of the endpoint device, which is less frequent than a cloud-based deployment. As such, if the AI model is misbehaving (e.g., operating erratically or unexpectedly), the misbehavior of the AI model can be prolonged which presents an inconvenience for an end user (e.g., a customer) and a developer (e.g., a service provider).

In cybersecurity, an AI model can be used to secure an endpoint device. For example, an AI model can classify, as malicious or benign, webpages that a user visits on an endpoint device. Cost and scalability of an AI model can prohibit the widespread use of AI for such an application. For example, to classify a webpage, a web crawler visits the webpage to extract data (e.g., screenshot(s), text, etc.) that is to be analyzed by an AI model. If the entire classification system is run (e.g., executed) in the backend (e.g., in the cloud), then the computational intensity of implementing a web crawler for each webpage will be prohibitively expensive to scale for several end-users. Furthermore, a web crawler cannot access deep webpages (e.g., webpages that are not indexed by standard search engines) and, as such, it is not feasible for analysis of such deep webpages.

Additionally, the performance and updateability of an AI model may be impacted in such applications. For example, if the entire AI model is run (e.g., executed) on an endpoint device, performance of the endpoint device and/or user experience on the endpoint device may be significantly degraded if the AI model is large (e.g., includes several layers having respective weight and activation matrices, requires a large amount of computational and/or memory resources to operate, etc.). Furthermore, when an AI model is deployed on an endpoint device, updateability of the AI model may be restricted based on the update schedule of the endpoint device. As such, the AI model may not be iterated on the fly (e.g., a new or updated model may not be deployed on the fly). Additionally, few end-users have access to an endpoint device that includes sufficient computational resources to execute large AI models.

Privacy is also a concern when classifying a webpage accessed by a user via an endpoint device. For example, a webpage accessed by a user may include sensitive information such as financial information (e.g., a bank account, a credit card account, a social security number, etc.) of the user, social media information of the user, medical information of the user, and/or data (e.g., pictures, text, etc.) indicative of the browsing habits and/or interests of the user. If a user opts in for a service provider to collect and send web browsing data (e.g., a screenshot, text, etc.) from an endpoint device to the cloud, then personal identifiable information (PII) of the user may be exposed in the cloud. For example, privacy may not be preserved when transferring web browsing data from an endpoint device to the cloud.

If such privacy concerns remain present, a user may not opt in to send web browsing data from an endpoint device to the cloud for classification purposes. Furthermore, some jurisdictions have regulations (e.g., the California Consumer Privacy Act (CCPA), the General Data Protection Regulation (GDPR) of the European Union, etc.) that require strict control of PII when stored and/or accessed in the cloud to ensure the PII remains secure. The privacy concerns described above may prevent the widespread adoption of AI.

One approach to protect privacy is homomorphic encryption. Homomorphic encryption is a form of encryption that allows for computations to be performed on encrypted data without performing decryption. As such, an AI model can perform inferences on encrypted data without the risk of exposing PII. However, homomorphic encryption can significantly reduce the speed with which an AI model can perform an inference. For example, an AI model processing homomorphic encrypted data can take up to one minute to provide a classification of whether the encrypted data is benign or malicious. To provide real-time benefits in classification analysis, an AI model should provide a classification in a much shorter time frame (e.g., within one to five seconds) of receiving data. Additionally, processing homomorphic encrypted data increases cost and reduces performance of an AI model.

Examples disclosed herein reduce the tradeoff between cost, scalability, performance, updateability, and privacy when deploying an AI model. For example, disclosed examples include a hybrid model that splits an AI workload between an endpoint device and the cloud in a manner that preserves privacy, reduces (e.g., significantly) performance impacts on an endpoint device, improves updatability of an AI model, and reduces the computational cost of implementing the AI model which increases the scalability of the AI model. Additionally, examples disclosed herein utilize a fixed-length latent space representation (e.g., 256 pixel by 256 pixel image) to secure privacy of PII. As such, the size of data transferred from an endpoint device to the cloud is reduced (e.g., with respect to raw data) and predictable. Reduced data size and predictability of data are both properties that facilitate scalable and cost-efficient infrastructure for deploying AI models.

Examples disclosed herein include a hybrid system including a low-resolution AI model and a high-resolution AI model. For example, disclosed systems, methods, apparatus, and articles of manufacture include a lightweight AI preprocessor that is executed on an endpoint device, a low-resolution AI model that is executed in the cloud, and a high-resolution AI model that is executed in the cloud. In such examples, the AI preprocessor, such as an encoder, processes samples to generate latent space representations of the samples. Additionally, in such examples, the low-resolution AI model filters potentially malicious samples for further processing by the high-resolution AI model. Furthermore, AI preprocessors may not require frequent updates. As such, examples disclosed herein preserve updateability of AI models while preserving privacy, reducing operational cost, and allowing for scalability.

FIG. 1 is a block diagram of an example system 100 to classify data accessed by one or more example endpoint devices 102 as benign or malicious. The system 100 of FIG. 1 includes the one or more example endpoint devices 102, an example network 104, and an example cloud network 106. In the example of FIG. 1, each of the one or more endpoint devices 102 includes first example interface circuitry 108 and one or more first example processor circuits 110.

In the illustrated example of FIG. 1, the cloud network 106 includes one or more first example network devices 112, an example suspect queue 114, an example web crawler 116, and one or more second example network devices 118. In the example of FIG. 1, each of the one or more first network devices 112 includes second example interface circuitry 120 and one or more second example processor circuits 122. Also, in the example of FIG. 1, each of the one or more second network devices 118 includes third interface circuitry 124 and one or more third example processor circuits 126.

In the illustrated example of FIG. 1, at least one of the one or more endpoint devices 102 is implemented by a mobile device (e.g., a smartphone, a tablet, a laptop, etc.) or a comparatively stationary device (e.g., a desktop computer, a workstation, etc.). Additionally or alternatively, at least one of the one or more endpoint devices 102 is implemented by a server (e.g., an application server, a communications server, a computing server, a database server, a media server, a sound server, a virtual server, a web server, a proxy server, etc.). In some examples, at least one of the one or more endpoint devices 102 is implemented by an Internet-of-Things (IoT) device (e.g., a camera, a lighting device, a refrigerator, a security device, a smart speaker, a thermostat, etc.) or any other device (e.g., a printer, a scanner, a virtual machine, a virtual environment, etc.).

In the illustrated example of FIG. 1, the first interface circuitry 108 is implemented by a network interface controller (NIC). Example NICs include a wireless NIC for communication over a wireless network such as a wireless fidelity (Wi-Fi) network, a Bluetooth network, or a cellular network (e.g., a fourth generation (4G) long-term evolution (LTE) network, a fifth generation (5G) network, a sixth generation (6G) network, etc.). Additionally or alternatively, example NICs include a wired NIC package for communication over a wired network such as via an ethernet connection.

In the illustrated example of FIG. 1, at least one of the one or more first processor circuits 110 is implemented by a central processor unit (CPU), a microprocessor, and/or a microcontroller (e.g., an Intel-based processor architecture, a reduced instruction set computer (RISC)-based processor architecture, an Advanced RISC Machine (ARM)-based processor architecture, a complex instruction set computer (CISC)-based processor architecture, etc.). Additionally or alternatively, at least one of the one or more first processor circuits 110 is implemented by a graphics processor unit (GPU), a digital signal processor (DSP), an application specific integrated circuit (ASIC), and/or a field programmable gate array (FPGA). In some examples, at least one of the one or more first processor circuits 110 is implemented by a scalar processor, a vector processor, or a superscalar processor, among others.

In the illustrated example of FIG. 1, the network 104 is implemented by the Internet. Additionally or alternatively, the network 104 may be implemented using any suitable wired and/or wireless network(s) including, for example, one or more data buses, one or more Local Area Networks (LANs), one or more wireless LANs, one or more cellular networks, one or more private networks, one or more public networks, etc. In the example of FIG. 1, the network 104 enables the one or more endpoint devices 102, the one or more first network devices 112, the web crawler 116, and/or the one or more second network devices 118 to be in communication.

In the illustrated example of FIG. 1, the cloud network 106 is implemented by cloud resources. For example, the cloud resources include networking resources (e.g., routers, switches, modems, etc.), memory resources (e.g., volatile memory such as random-access memory (RAM), static RAM (SRAM), dynamic RAM (DRAM), synchronous DRAM (SDRAM), synchronous graphics RAM (SGRAM), high bandwidth memory (HBM), etc.), storage resources (e.g., non-volatile memory such as hard disk drives (HDDs), solid-state drives (SSDs), etc.), and/or computing resources (e.g., CPUs, GPUs, DSPs, FPGAs, ASICs, etc.). In the example of FIG. 1, the cloud network 106 is implemented by a public cloud. For example, the cloud network 106 is owned and/or operated by a third-party service provider and services multiple end-users (e.g., individuals) and/or enterprises (e.g., businesses, non-profits, etc.).

Additionally or alternatively, the cloud network 106 is implemented by a private cloud. For example, the cloud network 106 is used exclusively by a single end-user or a single enterprise. In some examples, a private cloud is located on the premises of a user. In yet other examples, the cloud network 106 is implemented by a hybrid cloud. For example, a hybrid cloud combines a private cloud and a public cloud. As such, some cloud resources may be located at the premises of or used exclusively by an enterprise and some cloud resource may be owned and/or operated by a third-party service provider and used by multiple users.

In the illustrated example of FIG. 1, the cloud network 106 includes the one or more first network devices 112, the suspect queue 114, the web crawler 116, and the one or more second network devices 118, as described above. In the example of FIG. 1, the one or more first network devices 112 may be implemented by one or more of the cloud resources of the cloud network 106. For example, at least one of the one or more first network devices 112 may be implemented by a server including the second interface circuitry 120 and the one or more second processor circuits 122.

Additionally or alternatively, at least one of the one or more first network devices 112 may be implemented by a combination of one or more discrete NICs to implement the second interface circuitry 120 and one or more discrete processors to implement the one or more second processor circuits 122. In the example of FIG. 1, the second interface circuitry 120 is implemented similarly to the first interface circuitry 108. Additionally, the one or more second processor circuits 122 is implemented similarly to the one or more first processor circuits 110.

In the illustrated example of FIG. 1, the suspect queue 114 records data (e.g., one or more pointers to or one or more identifiers of one or more webpages suspected to be malicious). In the example of FIG. 1, the suspect queue 114 may be implemented by a volatile memory (e.g., an SDRAM, a DRAM, a RAMBUS Dynamic Random Access Memory (RDRAM), etc.) and/or a non-volatile memory (e.g., flash memory). Additionally or alternatively, the suspect queue 114 may be implemented by one or more double data rate (DDR) memories, such as DDR, DDR2, DDR3, DDR4, DDR5, mobile DDR (mDDR), DDR SDRAM, etc.

In some examples, the suspect queue 114 may be implemented by one or more mass storage devices such as HDD(s), compact disk (CD) drive(s), digital versatile disk (DVD) drive(s), SSD drive(s), Secure Digital (SD) card(s), CompactFlash (CF) card(s), etc. While in the illustrated example the suspect queue 114 is illustrated as a single database, the suspect queue 114 may be implemented by any number and/or type(s) of databases. Furthermore, data stored in the suspect queue 114 may be in any data format such as, for example, binary data, comma delimited data, tab delimited data, structured query language (SQL) structures, etc.

In the illustrated example of FIG. 1, the web crawler 116 includes interface circuitry and one or more processor circuits. For example, the interface circuitry is implemented similarly to the first interface circuitry 108. Additionally, the one or more processor circuits is implemented similarly to the one or more first processor circuits 110. In the example of FIG. 1, the one or more second network devices 118 may be implemented by one or more of the cloud resources of the cloud network 106. For example, at least one of the one or more second network devices 118 may be implemented by a server including the third interface circuitry 124 and the one or more third processor circuits 126.

Additionally or alternatively, at least one of the one or more second network devices 118 may be implemented by a combination of one or more discrete NICs to implement the third interface circuitry 124 and one or more discrete processors to implement the one or more third processor circuits 126. In the example of FIG. 1, the third interface circuitry 124 is implemented similarly to the first interface circuitry 108. Additionally, the one or more third processor circuits 126 is implemented similarly to the one or more first processor circuits 110.

In the illustrated example of FIG. 1, the one or more first processor circuits 110 implement an example endpoint agent 128 to secure the one or more endpoint devices 102. For example, as a user of the one or more endpoint devices 102 browses the web, the user may visit malicious and benign webpages. Malicious webpages may present popup windows that masquerade as legitimate communications from a service provider. For example, a popup window may masquerade as a message from a security service falsely indicating that the one or more endpoint devices 102 have been infected with a virus and/or other malware. The popup window may indicate that a user should call a telephone number or click a link to resolve the issue. However, the telephone number or link may connect the user to a malicious entity who may solicit sensitive information from the user under the false premise that the malicious entity is offering technical support. The above-described scam is referred to as a technical support scam or a tech support scam.

Figure 2A:
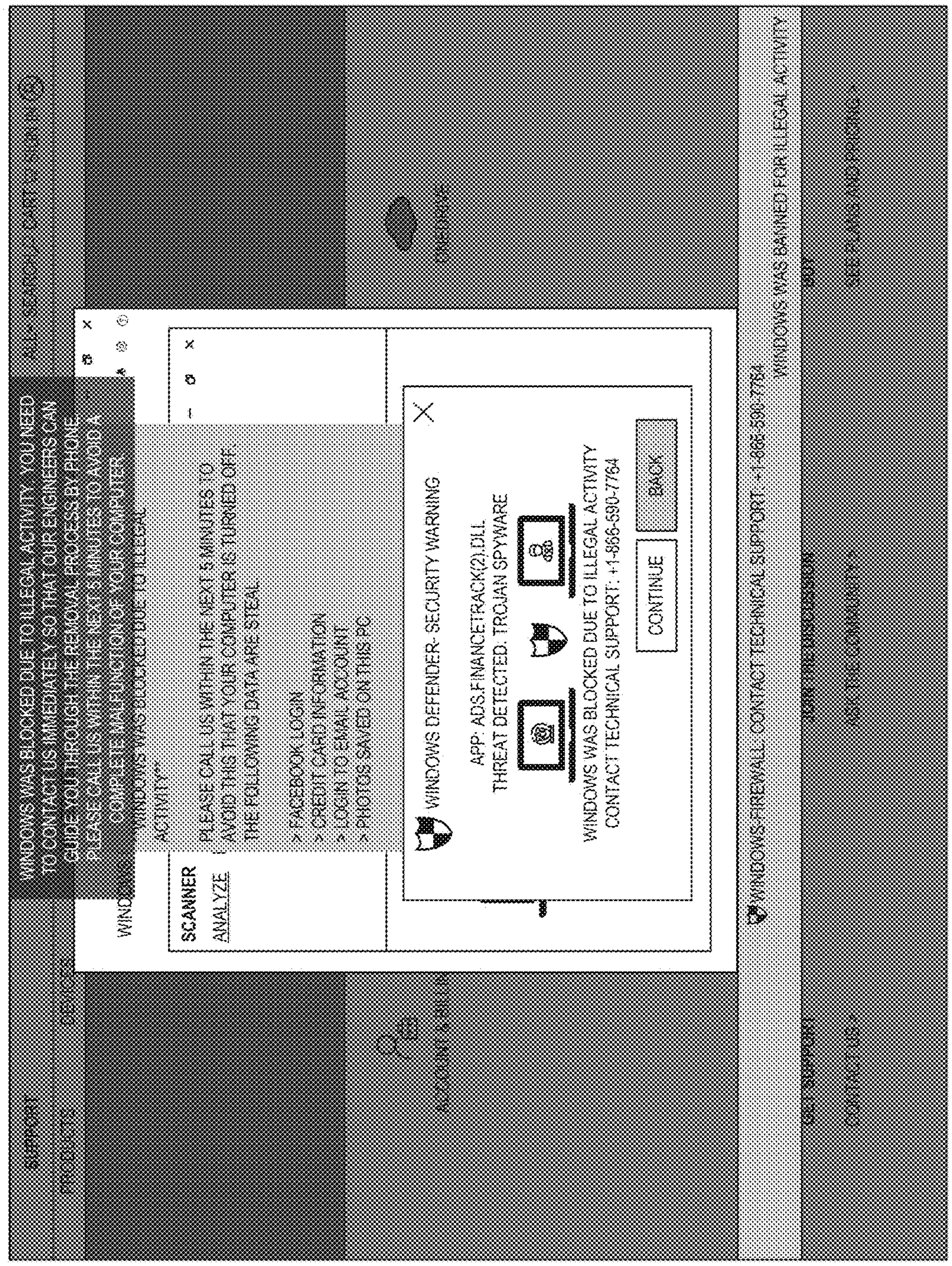
FIG. 2A is a graphical illustration of a first example technology support scam popup screen.
Figure 2B:
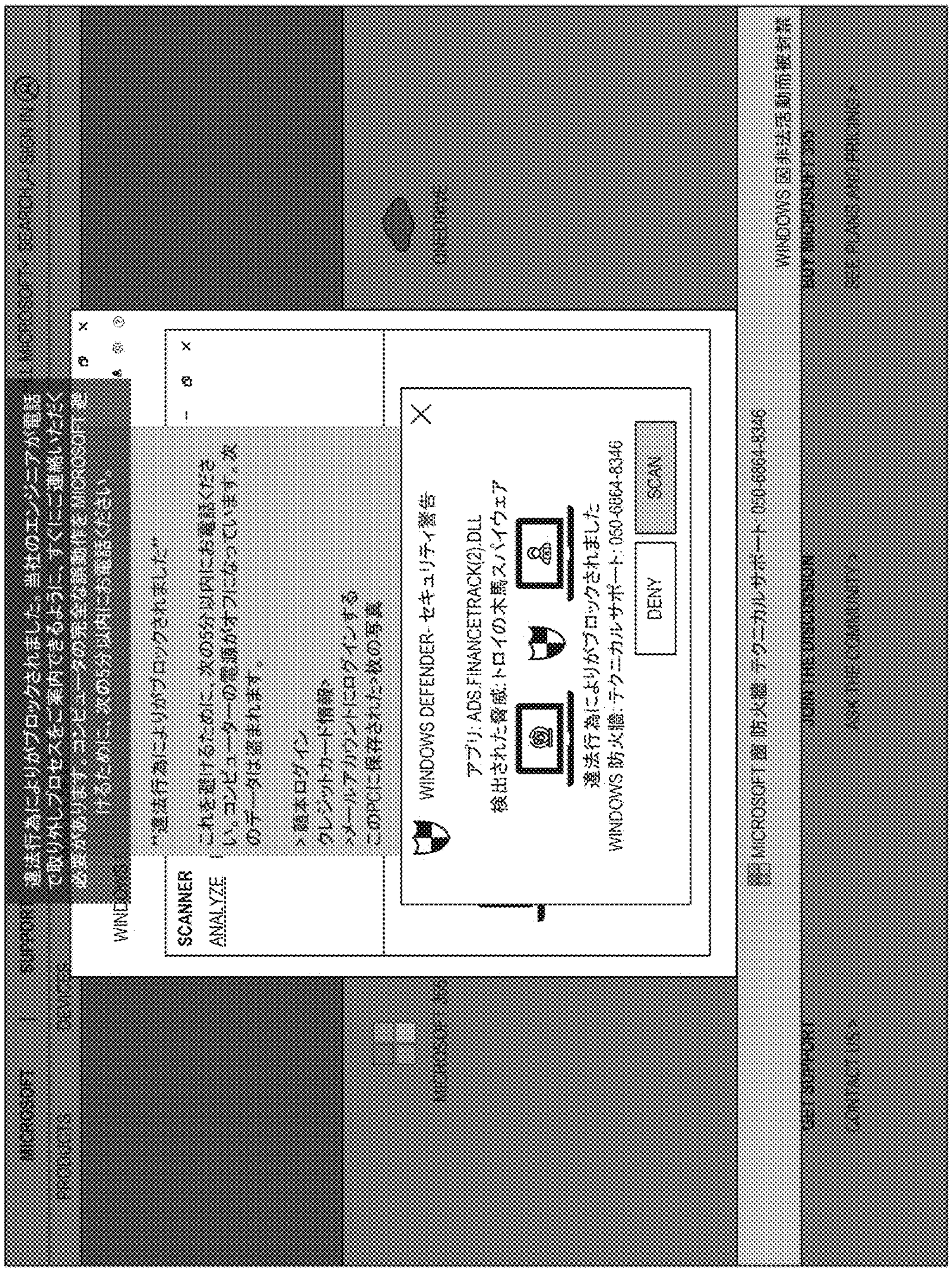
FIG. 2B is a graphical illustration of a second example technology support scam popup screen.
Figure 2C:
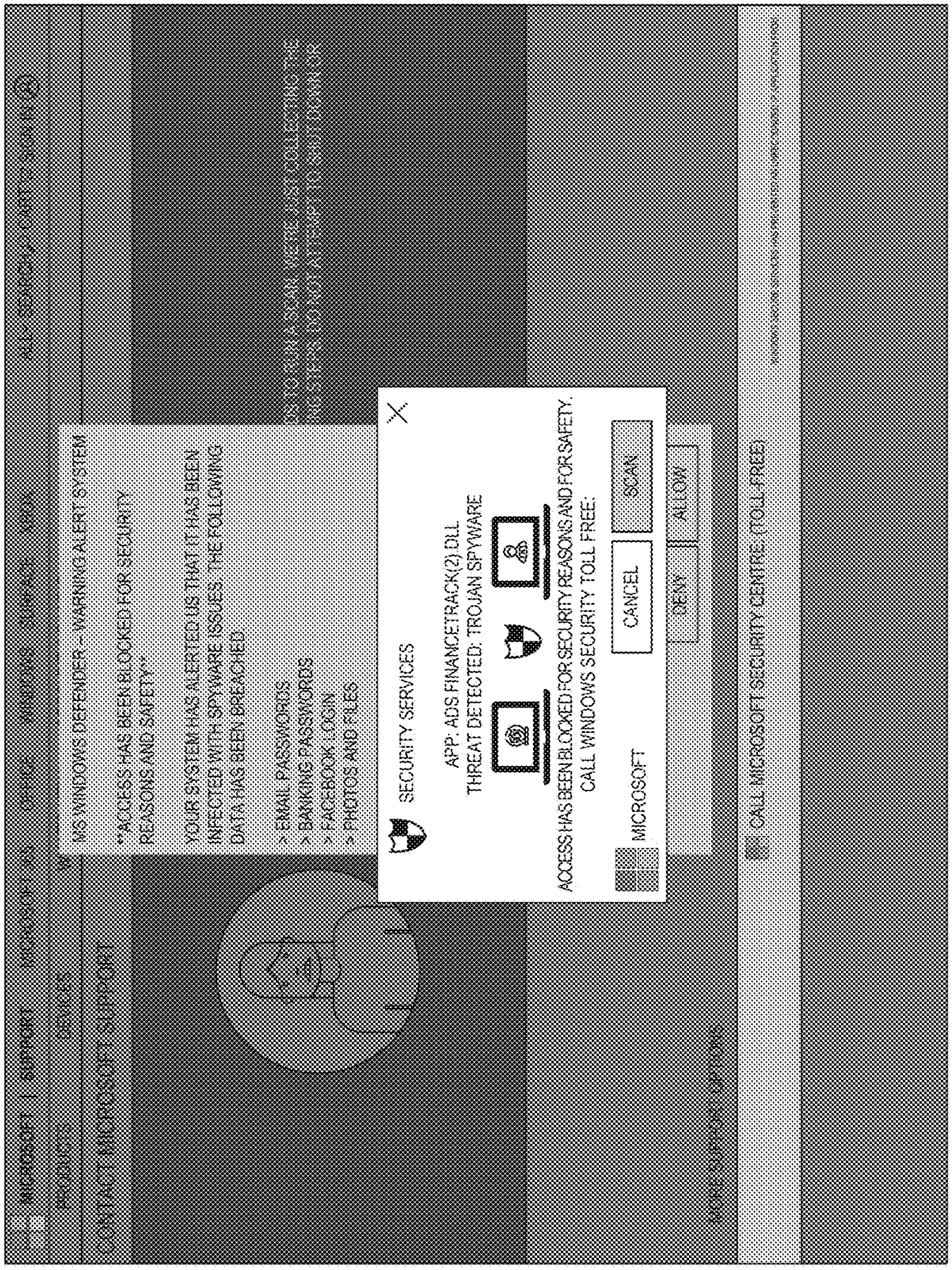
FIG. 2C is a graphical illustration of a third example technology support scam popup screen.

For example, FIG. 2A is a graphical illustration of a first example technology support scam popup screen 202. Additionally, FIG. 2B is a graphical illustration of a second example technology support scam popup screen 204. FIG. 2C is a graphical illustration of a third example technology support scam popup screen 206.

Returning to the illustrated example of FIG. 1, to secure the one or more endpoint devices 102, the endpoint agent 128 collects samples (e.g., screenshot(s), text, etc.) of browsing data for analysis by the cloud network 106. In the example of FIG. 1, the endpoint agent 128 implements a lightweight AI model, also referred to as a preprocessor or encoder, to convert samples of data (e.g., a screenshot of a webpage) into a latent space representation (LSR). A lightweight AI model refers to an AI model that is capable of being run on an endpoint device or a similarly less computationally capable device due to the relatively less resources required to implement the AI model as compared to larger AI models that require significant amounts of processing and/or memory resources.

In the illustrated example of FIG. 1, the endpoint agent 128 transforms a sample (e.g., a signal) into a different shape or format so that PII within the sample is destroyed (e.g., obfuscated, hidden, blocked, etc.), while keeping some useful information (e.g., signal) for analysis by the low-resolution AI model described above. Many different types of machine learning models and/or machine learning architectures exist. In examples disclosed herein, the endpoint agent 128 implements an encoder model with an autoencoder architecture. For example, an encoder model includes one or more layers that digest input data (e.g., raw data, a screenshot of a webpage, etc.) into a bottleneck layer that includes less neurons or nodes than a preceding layer. As such, the bottleneck layer reduces the dimensionality of data received from a preceding layer. The dimensionally reduced output data is referred to as an LSR of the input data. In examples where input data to the encoder model is a screenshot, the LSR of the screenshot is a pixel-based screenshot.

Figure 3:
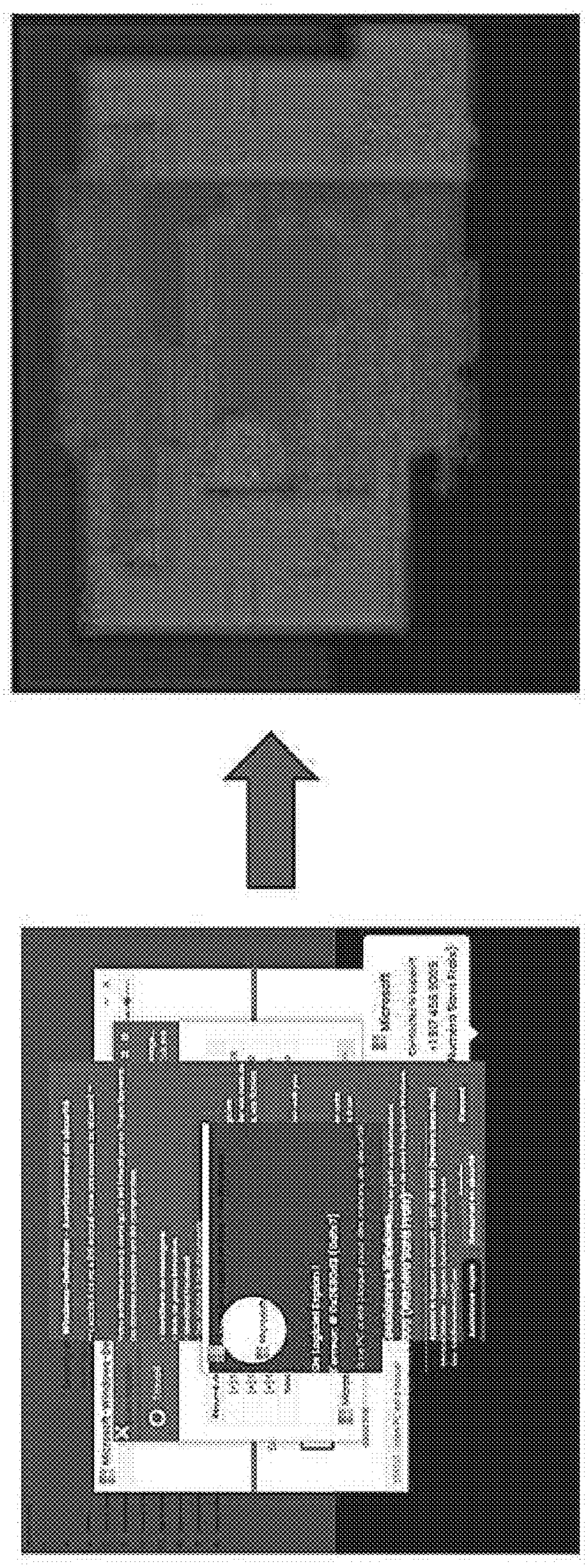
FIG. 3 is a graphical illustration of an example latent space representation of a fourth example technology support popup screen.

FIG. 3 is a graphical illustration of an example LSR 302 of a fourth example technology support popup screen 304. In the example of FIG. 3, the fourth technology support popup screen 304 represents a screenshot or image and the LSR 302 represents a dimensionally reduced version of the screenshot or image. For example, the LSR 302 represents the "shadow" of the fourth technology support popup screen 304. As such, any PII in the fourth technology support popup screen 304 is destroyed when the encoder model of the endpoint agent 128 transforms (e.g., encodes) the fourth technology support popup screen 304 into the LSR 302. In additional or alternative examples, the LSR 302 could be any other format and not necessarily an image per se. In examples disclosed herein, a latent space representation refers to a representation of data than embeds the data into a compressed and/or dimensionally reduced form that removes PII from the data.

Returning to the illustrated example of FIG. 1, by implementing an encoder model, the endpoint agent 128 converts a sample of a webpage into an encoded representation (e.g., an LSR, an embedding, etc.) that obfuscates (e.g., hides, removes, etc.) PII in the sample. Additionally, because encoder models are semi-static models that rarely change (e.g., do not require frequent updates), the endpoint agent 128 can continue to accurately encode samples into an LSR regardless of the update schedule of the one or more endpoint devices 102. In general, machine learning models/architectures that are suitable to use to implement the endpoint agent 128 will be those that convert raw data into an obfuscated representation (e.g., an embedding vector) and do not require frequent updating (e.g., tuning). One consideration for selection of a machine learning model/architecture for the encoder model is that the model should not compress input data to a degree that prohibits later processing of the embedded representation. Other types of machine learning models could additionally or alternatively be used such as a contrastive language-image pretraining embedding model, a vision transformer, and/or any other encoder and/or decoder AI/ML framework, among others.

In examples disclosed herein, ML/AI models are trained using gradient descent. However, any other training algorithm may additionally or alternatively be used. In examples disclosed herein, training is performed until the measured loss of the encoder model satisfies a threshold value. In examples disclosed herein, training is performed on resources owned, leased, and/or operated by a service provider (e.g., hosted in the cloud network 106). Training is performed using hyperparameters that control how the learning is performed (e.g., a learning rate, a number of layers to be used in the machine learning model, etc.). In examples disclosed herein, hyperparameters that control the number of epochs of training, learning rate, gradient accumulation frequency, a warmup ratio (e.g., the number of epochs before weight adjustment begins), weight decay, etc. are used. Such hyperparameters are selected by, for example, a human engineer designing the model, a search algorithm (e.g., a best fit algorithm), etc. In some examples, retraining may be performed. Such retraining may be performed in response to a threshold amount of time elapsing dependent on use case. For example, retraining may be performed based on a frequency with which scams are changed.

Training is performed using training data. In examples disclosed herein, the training data originates from the web. For example, a service provider can collect training data by visiting benign and/or suspicious webpages to collect screenshots of the webpages and/or any popups on the webpages. Because supervised training is used, the training data is labeled. Labeling is applied to the training data by a human reviewer. Additionally or alternatively, labeling can be performed as an automated process based on a reference database including known classifications of webpages as benign or malicious. In some examples, the training data is preprocessed, for example, to adjust the dimensions of input data to a specified input dimension for the model (e.g., to convert the input data into a square with padding to preserve an aspect ratio of an input image). In some examples, the training data is sub-divided into a training set, a validation set, and a testing set. Once training is complete, the model is deployed for use as an executable construct that processes an input and provides an output based on the network of nodes and connections defined in the model. The model is stored at the one or more endpoint devices 102. The model may then be executed by the one or more first processor circuits 110. In some examples, the encoder model is executed on specialized hardware such as a GPU and/or a tensor processing unit (TPU).

In the illustrated example of FIG. 1, the endpoint agent 128 may be instantiated (e.g., creating an instance of, bring into being for any length of time, materialize, implement, etc.) by programmable circuitry such as a Central Processor Unit (CPU) executing first instructions. Additionally or alternatively, the endpoint agent 128 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

In the illustrated example of FIG. 1, the endpoint agent 128 sends LSR data to the cloud network 106 for analysis. For example, if a user visited an unclassified website, the endpoint agent 128 captures (e.g., obtains) a screenshot of the unclassified website, transforms the screenshot into an LSR, and safely (e.g., in terms of protecting PII) sends the LSR to a backend application programming interface (API) with the cloud network 106. For example, the endpoint agent 128 sends an LSR representation of a sample of a webpage and a pointer, identifier, and/or any other identifying information for the webpage (e.g., a uniform resource location (URL)) to the cloud network 106 via the backend API. In some examples, the endpoint agent 128 encrypts a sample of a webpage using homomorphic encryption.

In some examples, at least one of the one or more endpoint devices 102 is implemented by a networking device (e.g., a router, a modem, a repeater, a network switch, a gateway, an access point, a bridge, a hub, etc.). In such examples, the networking device collects one or more samples of user browsing data and forwards one or more LSRs of the one or more samples to the cloud network 106. In some such examples, the networking device operates as a centralized security hub for endpoint devices at the edge of a network (e.g., a point at which an enterprise or personal network connects to a third-party network such as the Internet, another personal network, another enterprise network, etc.).

In the illustrated example of FIG. 1, the one or more second processor circuits 122 implement an example low-resolution AI model 130 to process LSR data received from the one or more endpoint devices 102. For example, when an LSR is received at the cloud network 106, the low-resolution AI model 130 runs an inference using the LSR as input to classify a webpage as potentially malicious or benign. In the example of FIG. 1, the low-resolution AI model 130 operates with speed, but not necessarily with accuracy. For example, to facilitate scalability, the low-resolution AI model 130 runs inferences while consuming a relatively low amount of resources so that the low-resolution AI model 130 can be scaled without significant performance cost impact.

In the illustrated example of FIG. 1, performance of the low-resolution AI model 130 achieves high recall and low precision. In the context of classification, recall refers to how often positive instances are correctly classified (e.g., true positives) from all actual positive samples in a dataset. Recall can be computed as the ratio between (a) the number of samples correctly classified into a class (e.g., the number of true positives) and (b) the number of samples in the class (e.g., the number of true positives and the number of false negatives (e.g., missed classifications for the class)).

Additionally, in the context of classification, precision refers to how often positive instances are correctly classified. Precision can be computed as the ratio between (a) the number of samples correctly classified into a class (e.g., true positives) and (b) the number of classifications made for the class (e.g., the number of true positives and the number of false positives (e.g., incorrect classifications for the class)). In other words, the low-resolution AI model 130 is designed to be sensitive enough to classify a high percentage of actually malicious samples as potentially malicious even if the low-resolution AI model 130 occasionally classifies some benign samples as potentially malicious.

For example, the low-resolution AI model 130 has an accuracy between 50-75%, a recall of 98.24%, and a precision of 50.25%. In the example of FIG. 1, the tradeoff between recall and precision allows the low-resolution AI model 130 to be nimble, fast, and cost effective. For example, the tradeoff between recall and precision allows the low-resolution AI model 130 to reduce the computational burden to scale the low-resolution AI model 130 while still detecting potentially malicious samples. As such, the low-resolution AI model 130 can scale to serve millions of requests. Accordingly, the low-resolution AI model 130 filters out potentially malicious samples for further analysis by the high-resolution AI model described above.

Many different types of machine learning models and/or machine learning architectures exist. In examples disclosed herein, the low-resolution AI model 130 is implemented by a shifted windows (SWIN) transformer model. Using a SWIN transformer model enables processing of LSR data. In general, machine learning models/architectures that are suitable to use in the example approaches disclosed herein will be those that can ingest input data formatted as an embedding vector. For example, in the example of FIG. 1, input data to the low-resolution AI model 130 is formatted as an LSR image. However, other types of machine learning models could additionally or alternatively be used such as a vision transformer, a convolutional neural network (CNN) (e.g., a CNN from the ConvNeXt family, the ConvNeXt V2 family, etc.), etc.

In examples disclosed herein, ML/AI models are trained using gradient descent. However, any other training algorithm may additionally or alternatively be used. In examples disclosed herein, training is performed until the measured loss of the low-resolution AI model 130 satisfies a threshold value. In examples disclosed herein, training is performed on resources owned, leased, and/or operated by a service provider (e.g., hosted in the cloud network 106). Training is performed using hyperparameters that control how the learning is performed (e.g., a learning rate, a number of layers to be used in the machine learning model, etc.). In examples disclosed herein, hyperparameters that control the number of epochs of training, learning rate, gradient accumulation frequency, a warmup ratio (e.g., the number of epochs before weight adjustment begins), weight decay, etc. Such hyperparameters are selected by, for example, a human engineer designing the model, a search algorithm (e.g., a best fit algorithm), etc. In some examples, retraining may be performed. Such retraining may be performed in response to a threshold amount of time elapsing dependent on use case. For example, retraining may be performed based on a frequency with which scams are changed.

Training is performed using training data. In examples disclosed herein, the training data originates from the output of the encoder model of the endpoint agent 128. For example, LSRs generated for benign and/or malicious websites are collected by a service provider and utilized as training data for the low-resolution AI model 130. Because supervised training is used, the training data is labeled. Labeling is applied to the training data by a human reviewer. Additionally or alternatively, labeling can be performed as an automated process based on a reference database including known classifications of webpages as benign or malicious. In some examples, the training data is preprocessed by the endpoint agent 128 to convert an input image into an LSR of the input image. In some examples, the training data is sub-divided into a training set, a validation set, and a testing set. Once training is complete, the model is deployed for use as an executable construct that processes an input and provides an output based on the network of nodes and connections defined in the model. The model is stored at the one or more first network devices 112 of the cloud network 106. The model may then be executed by the one or more second processor circuits 122. In some examples, the low-resolution AI model 130 is executed on specialized hardware such as a GPU and/or a TPU.

In the illustrated example of FIG. 1, the low-resolution AI model 130 may be instantiated (e.g., creating an instance of, bring into being for any length of time, materialize, implement, etc.) by programmable circuitry such as a Central Processor Unit (CPU) executing first instructions. Additionally or alternatively, the low-resolution AI model 130 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

In the illustrated example of FIG. 1, if the low-resolution AI model 130 classifies a webpage as potentially malicious (e.g., suspicious, harmful, etc.) based on an LSR of a sample of the webpage, the low-resolution AI model 130 pushes (e.g., is to cause storage of) a pointer (e.g., a URL) for the webpage to the suspect queue 114. Additionally or alternatively, the low-resolution AI model 130 can cause the second interface circuitry 120 to send an instruction and/or other communication to the one or more endpoint devices 102. For example, the instruction and/or other communication causes the one or more endpoint devices 102 to display a message or warning to a user to inform the user that a webpage the user is visiting may be malicious. In some examples, the instruction and/or other communication causes the one or more endpoint devices 102 to prevent a user from entering information into a webpage visited by the user.

In the illustrated example of FIG. 1, the suspect queue 114 accumulates pointers to potentially malicious webpages where more accurate analysis can provide a more confident classification. In the example of FIG. 1, the web crawler 116 accesses the suspect queue 114 to get a pointer to a potentially malicious webpage and to process the pointer. For example, the web crawler 116 visits (e.g., accesses) the potentially malicious webpage indicated by the pointer (e.g., URL) pushed into the suspect queue 114 and obtains another sample of the potentially malicious webpage. For example, the sample collected by the web crawler 116 is a raw screenshot of or clear text data collected from the potentially malicious webpage. Because the web crawler 116 operates in the cloud network 106 (e.g., the backend), user PII is not involved in the access to the potentially malicious webpage. As such, PII is not involved in the processing and the web crawler 116 does not convert the collected sample to an LSR.

In the illustrated example of FIG. 1, the web crawler 116 forwards raw data samples of potentially malicious webpages to the one or more second network devices 118 for further processing. In some examples, the web crawler 116 also generates an LSR of a sample of a potentially malicious webpage to facilitate validation. For example, the web crawler 116 can compare the LSR received from the one or more endpoint devices 102 to the LSR generated by the web crawler 116. Such comparison may help reduce false positives and increase confidence that the same content seen by a user is also being seen by the web crawler 116 (e.g., in case the content of a potentially malicious webpage has changed during analysis by the cloud network 106).

In the illustrated example of FIG. 1, the web crawler 116 may be instantiated (e.g., creating an instance of, bring into being for any length of time, materialize, implement, etc.) by programmable circuitry such as a Central Processor Unit (CPU) executing first instructions. Additionally or alternatively, the web crawler 116 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

In the illustrated example of FIG. 1, the one or more third processor circuits 126 implement an example high-resolution AI model 132 to process raw data samples received from the web crawler 116. For example, the high-resolution AI model 132 is comparatively more expensive to implement than the low-resolution AI model 130 with the advantage of being more accurate. In the example of FIG. 1, because the high-resolution AI model 132 processes raw data, the high-resolution AI model 132 achieves higher accuracy when classifying data.

As such, the high-resolution AI model 132 can accurately (e.g., with high recall and high precision) classify a webpage as malicious or benign (e.g., set the reputation of a webpage as either dirty or clean). For example, the high-resolution AI model 132 has an accuracy between 90-95+%, a recall of 92.92%, and a precision of 97.65%. In the example of FIG. 1, the high-resolution AI model 132 does not run for every sample received from the one or more endpoint devices 102. For example, as many samples are preliminarily classified as benign by the low-resolution AI model 130 and those classified as potentially malicious are identified in the suspect queue 114, the high-resolution AI model 132 processes those samples retrieved by the web crawler 116 based on the suspect queue 114. As such, the high-resolution AI model 132 does not impact the scalability of the system 100.

Many different types of machine learning models and/or machine learning architectures exist. In examples disclosed herein, the high-resolution AI model 132 is implemented by a SWIN transformer model that is trained to have high recall and high precision with respect to the low-resolution AI model 130. Using a SWIN transformer model trained to have high recall and high precision enables the high-resolution AI model 132 to classify input data more accurately than the low-resolution AI model 130. In general, machine learning models/architectures that are suitable to use in the example approaches disclosed herein will be those that can classify input data in a specified format. For example, in the example of FIG. 1, input data to the high-resolution AI model 132 is formatted as an image. However, other types of machine learning models could additionally or alternatively be used such as a vision transformer, a CNN (e.g., a CNN from the ConvNeXt family, the ConvNeXt V2 family, etc.), etc.

In examples disclosed herein, ML/AI models are trained using gradient descent. However, any other training algorithm may additionally or alternatively be used. In examples disclosed herein, training is performed until the measured loss of the high-resolution AI model 132 satisfies a threshold value. In examples disclosed herein, training is performed on resources owned, leased, and/or operated by a service provider (e.g., hosted in the cloud network 106). Training is performed using hyperparameters that control how the learning is performed (e.g., a learning rate, a number of layers to be used in the machine learning model, etc.). In examples disclosed herein, hyperparameters that control the number of epochs of training, learning rate, gradient accumulation frequency, a warmup ratio (e.g., the number of epochs before weight adjustment begins), weight decay, etc. Such hyperparameters are selected by, for example, a human engineer designing the model, a search algorithm (e.g., a best fit algorithm), etc. In some examples, retraining may be performed. Such retraining may be performed in response to a threshold amount of time elapsing dependent on use case. For example, retraining may be performed based on a frequency with which scams are changed.

Training is performed using training data. In examples disclosed herein, the training data originates from raw images collected by the endpoint agent 128 and/or raw images collected by the web crawler 116. Because supervised training is used, the training data is labeled. Labeling is applied to the training data by a human reviewer. Additionally or alternatively, labeling can be performed as an automated process based on a reference database including known classifications of webpages as benign or malicious. In some examples, the training data is preprocessed, for example, to adjust the dimensions of input data to a specified input dimension for the model (e.g., to convert the input data into a square with padding to preserve an aspect ratio of an input image). In some examples, the training data is subdivided into a training set, a validation set, and a testing set. Once training is complete, the model is deployed for use as an executable construct that processes an input and provides an output based on the network of nodes and connections defined in the model. The model is stored at the one or more second network devices 118 of the cloud network 106. The model may then be executed by the one or more third processor circuits 126. In some examples, the high-resolution AI model 132 is executed on specialized hardware such as a GPU and/or a TPU.

In the illustrated example of FIG. 1, the high-resolution AI model 132 may be instantiated (e.g., creating an instance of, bring into being for any length of time, materialize, implement, etc.) by programmable circuitry such as a Central Processor Unit (CPU) executing first instructions. Additionally or alternatively, the high-resolution AI model 132 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

In the illustrated example of FIG. 1, if the high-resolution AI model 132 classifies a webpage as malicious, the high-resolution AI model 132 updates a reputation for the webpage to be malicious. Additionally or alternatively, the high-resolution AI model 132 can cause the third interface circuitry 124 to send an instruction and/or other communication to the one or more endpoint devices 102. For example, the instruction and/or other communication causes the one or more endpoint devices 102 to block the webpage.

In the illustrated example of FIG. 1, if the high-resolution AI model 132 classifies a webpage as benign, the high-resolution AI model 132 updates a reputation for the webpage to be benign. Additionally or alternatively, the high-resolution AI model 132 can cause the third interface circuitry 124 to send an instruction and/or other communication to the one or more endpoint devices 102. For example, the instruction and/or other communication causes the one or more endpoint devices 102 to permit access to the webpage.

As described above, the system 100 includes the endpoint agent 128 (e.g., a lightweight PII preserving encoder) to generate a latent space representation of a sample of a webpage. As described above, a latent space representation of a webpage allows the one or more endpoint devices 102 to safely transfer a sample of the webpage over a network without exposing PII of a user. The system 100 also includes the low-resolution AI model 130 to process a latent space representation of a sample of a webpage and classify the webpage as benign or potentially malicious. Additionally, the system 100 includes the high-resolution AI model 132 to classify a webpage using a raw data sample of the webpage when signaled by the low-resolution AI model 130. For example, based on (e.g., in response to, responsive to, etc.) the low-resolution AI model 130 classifying a webpage as potentially malicious, the high-resolution AI model 132 classifies the webpage as benign or actually malicious.

Examples disclosed herein include an effective hybrid AI deployment and interaction framework. For example, disclosed systems, methods, apparatus, and articles of manufacture include a low-resolution AI model (e.g., the low-resolution AI model 130) deployed in the cloud that performs a desired task with low accuracy and high recall to act as a filter for a more computationally intensive high-resolution AI model (e.g., the high-resolution AI model 132) deployed in the cloud. Examples disclosed herein are scalable, cost effective, privacy preserving, updateable, and improve performance. Additionally, while the example of FIG. 1 focuses on classifying websites via image data, examples disclosed herein are not limited to this specific use case. For example, disclosed systems, methods, apparatus, and articles of manufacture are applicable to classification of any data such as text data, audio data, and/or video data.

Figure 4:
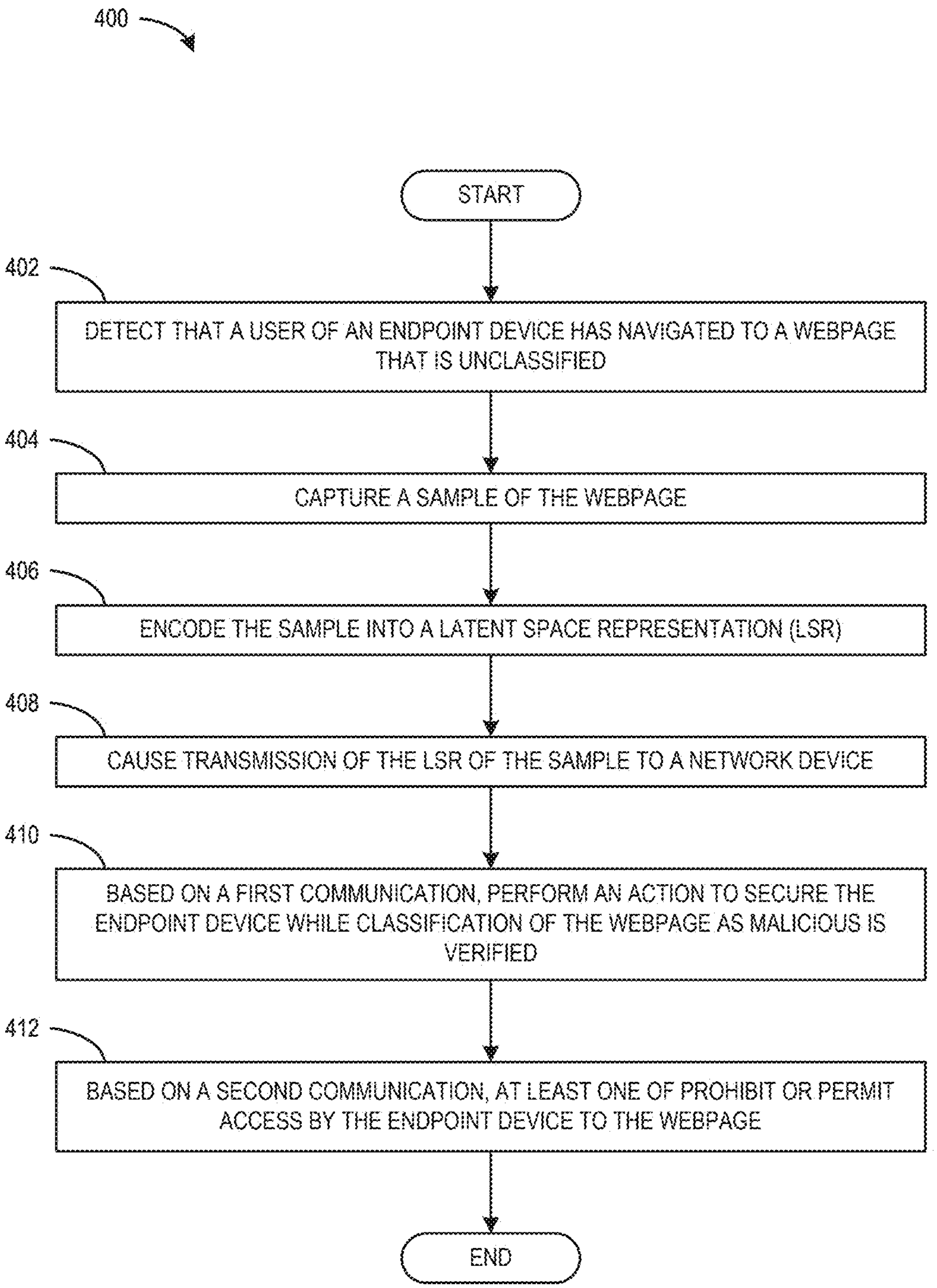
FIG. 4 is a flowchart representative of example machine-readable instructions and/or example operations that may be executed, instantiated, and/or performed by example programmable circuitry to implement the one or more endpoint devices of FIG. 1.

In some examples, the endpoint agent 128 is instantiated by programmable circuitry executing endpoint agent instructions and/or configured to perform operations such as those represented by the flowchart(s) of FIG. 4. In some examples, the one or more endpoint devices 102 includes means for securing an endpoint. For example, the means for securing may be implemented by the endpoint agent 128. In some examples, the endpoint agent 128 may be instantiated by programmable circuitry such as the example programmable circuitry 612 of FIG. 6. For instance, the endpoint agent 128 may be instantiated by the example microprocessor 700 of FIG. 7 executing machine-executable instructions such as those implemented by at least blocks 402, 404, 406, 408, 410, and 412 of FIG. 4.

Figure 8:
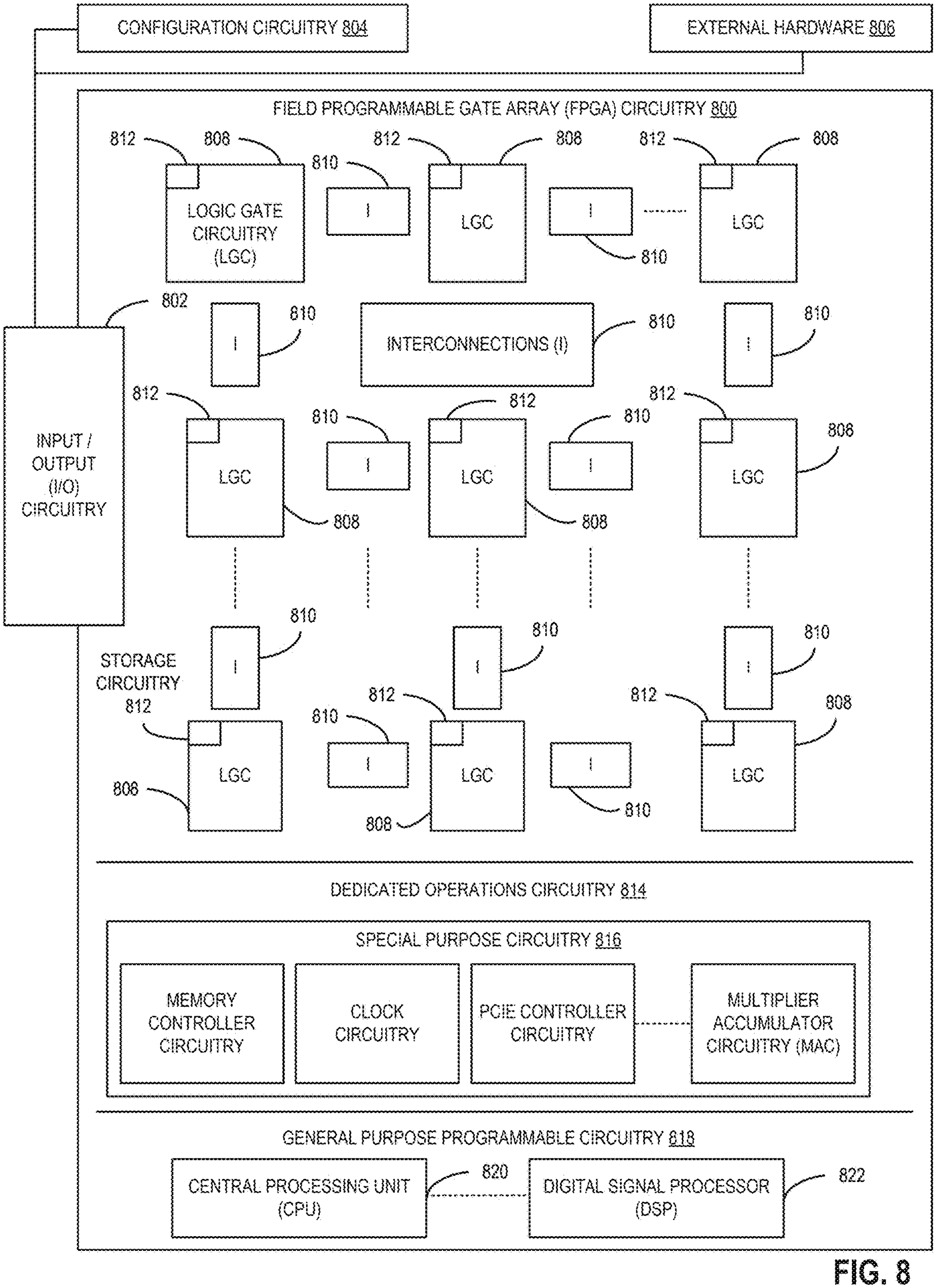
FIG. 8 is a block diagram of another example implementation of the programmable circuitry of FIG. 6.

In some examples, the endpoint agent 128 may be instantiated by hardware logic circuitry, which may be implemented by an ASIC, XPU, or the FPGA circuitry 800 of FIG. 8 configured and/or structured to perform operations corresponding to the machine-readable instructions. Additionally or alternatively, the endpoint agent 128 may be instantiated by any other combination of hardware, software, and/or firmware. For example, the endpoint agent 128 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

Figure 5:
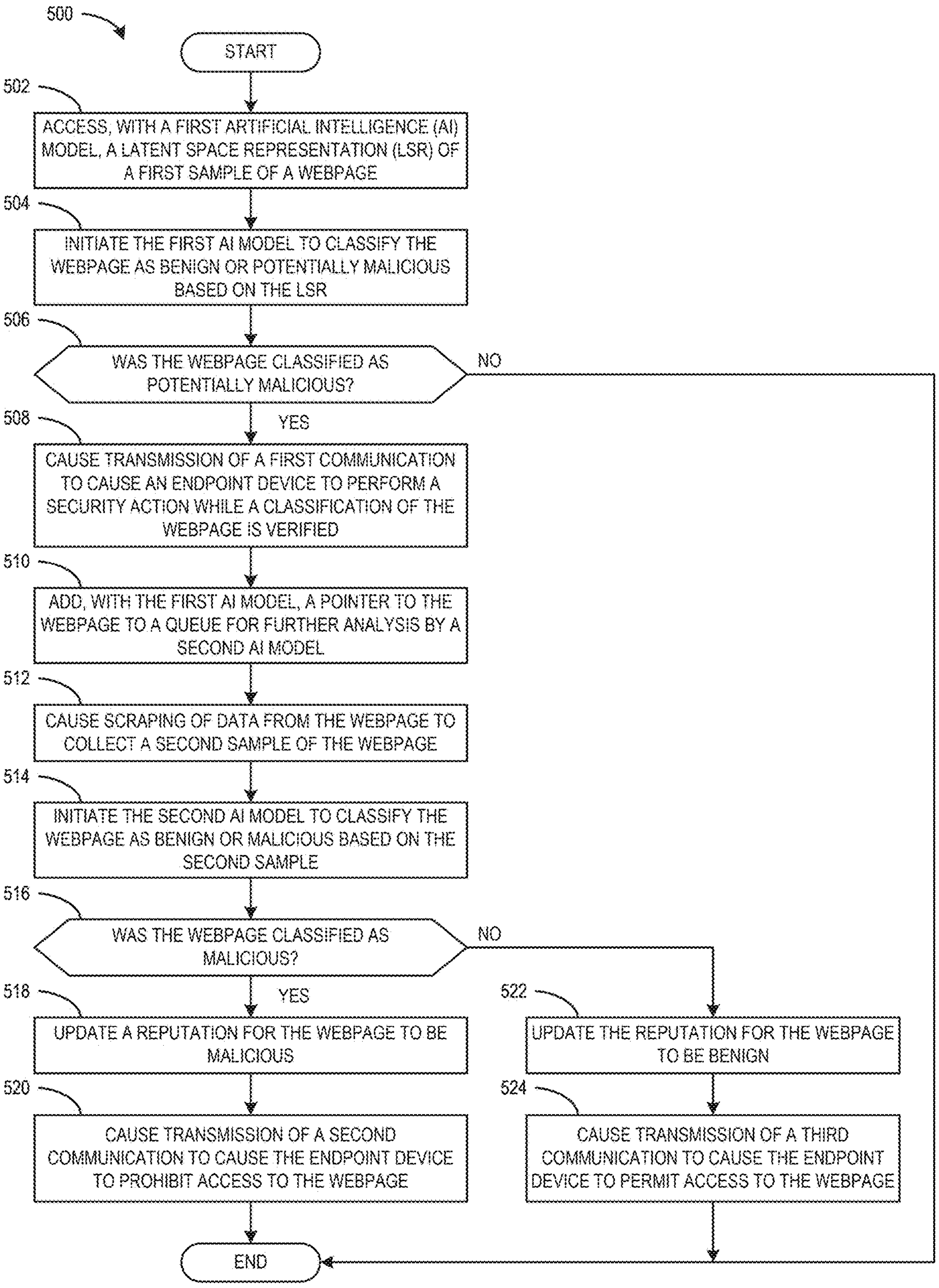
FIG. 5 is a flowchart representative of example machine-readable instructions and/or example operations that may be executed, instantiated, and/or performed by example programmable circuitry to implement the cloud network of FIG. 1.

In some examples, the web crawler 116 is instantiated by programmable circuitry executing web crawling instructions and/or configured to perform operations such as those represented by the flowchart(s) of FIG. 5. In some examples, the cloud network 106 includes means for crawling the web. For example, the means for crawling may be implemented by the web crawler 116. In some examples, the web crawler 116 may be instantiated by programmable circuitry such as the example programmable circuitry 612 of FIG. 6. For instance, the web crawler 116 may be instantiated by the example microprocessor 700 of FIG. 7 executing machine-executable instructions such as those implemented by at least block 512 of FIG. 5.

In some examples, the web crawler 116 may be instantiated by hardware logic circuitry, which may be implemented by an ASIC, XPU, or the FPGA circuitry 800 of FIG. 8 configured and/or structured to perform operations corresponding to the machine-readable instructions. Additionally or alternatively, the web crawler 116 may be instantiated by any other combination of hardware, software, and/or firmware. For example, the web crawler 116 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the low-resolution AI model 130 is instantiated by programmable circuitry executing preliminary classification instructions and/or configured to perform operations such as those represented by the flowchart(s) of FIG. 5. In some examples, the cloud network 106 includes means for preliminarily classifying data. For example, the means for preliminarily classifying may be implemented by the low-resolution AI model 130. In some examples, the low-resolution AI model 130 may be instantiated by programmable circuitry such as the example programmable circuitry 612 of FIG. 6. For instance, the low-resolution AI model 130 may be instantiated by the example microprocessor 700 of FIG. 7 executing machine-executable instructions such as those implemented by at least blocks 502, 504, 506, 508, and 510 of FIG. 5.

In some examples, the low-resolution AI model 130 may be instantiated by hardware logic circuitry, which may be implemented by an ASIC, XPU, or the FPGA circuitry 800 of FIG. 8 configured and/or structured to perform operations corresponding to the machine-readable instructions. Additionally or alternatively, the low-resolution AI model 130 may be instantiated by any other combination of hardware, software, and/or firmware. For example, the low-resolution AI model 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the high-resolution AI model 132 is instantiated by programmable circuitry executing subsequent classification instructions and/or configured to perform operations such as those represented by the flowchart(s) of FIG. 5. In some examples, cloud network 106 includes means for subsequently classifying data. For example, the means for subsequently classifying may be implemented by the high-resolution AI model 132. In some examples, the high-resolution AI model 132 may be instantiated by programmable circuitry such as the example programmable circuitry 612 of FIG. 6. For instance, the high-resolution AI model 132 may be instantiated by the example microprocessor 700 of FIG. 7 executing machine-executable instructions such as those implemented by at least blocks 514, 516, 518, 520, 522, and 524 of FIG. 5.

In some examples, the high-resolution AI model 132 may be instantiated by hardware logic circuitry, which may be implemented by an ASIC, XPU, or the FPGA circuitry 800 of FIG. 8 configured and/or structured to perform operations corresponding to the machine-readable instructions. Additionally or alternatively, the high-resolution AI model 132 may be instantiated by any other combination of hardware, software, and/or firmware. For example, the high-resolution AI model 132 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

While an example manner of implementing the one or more endpoint devices 102 of FIG. 1 is illustrated in FIG. 1, one or more of the elements, processes, and/or devices illustrated in FIG. 1 may be combined, divided, re-arranged, omitted, eliminated, and/or implemented in any other way. Additionally, while an example manner of implementing the cloud network 106 of FIG. 1 is illustrated in FIG. 1, one or more of the elements, processes, and/or devices illustrated in FIG. 1 may be combined, divided, re-arranged, omitted, eliminated, and/or implemented in any other way. Further, the first example interface circuitry 108, the one or more first example processor circuits 110, the example endpoint agent 128, and/or, more generally, the one or more example endpoint devices 102 of FIG. 1 and/or the second example interface circuitry 120, the one or more second example processor circuits 122, the example low-resolution AI model 130, and/or, more generally, the one or more first example network devices 112, the example suspect queue 114, the example web crawler 116, the third example interface circuitry 124, the one or more third example processor circuits 126, the example high-resolution AI model 132, and/or, more generally, the one or more second example network devices 118, and/or, more generally, the example cloud network 106 of FIG. 1, may be implemented by hardware alone or by hardware in combination with software and/or firmware.

Thus, for example, any of the first example interface circuitry 108, the one or more first example processor circuits 110, the example endpoint agent 128, and/or, more generally, the one or more example endpoint devices 102 of FIG. 1 and/or the second example interface circuitry 120, the one or more second example processor circuits 122, the example low-resolution AI model 130, and/or, more generally, the one or more first example network devices 112, the example suspect queue 114, the example web crawler 116, the third example interface circuitry 124, the one or more third example processor circuits 126, the example high-resolution AI model 132, and/or, more generally, the one or more second example network devices 118, and/or, more generally, the example cloud network 106 of FIG. 1, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the one or more example endpoint devices 102 of FIG. 1 may include one or more elements, processes, and/or devices in addition to, or instead of, those illustrated in FIG. 1, and/or may include more than one of any or all of the illustrated elements, processes, and devices. Additionally, the example cloud network 106 may include one or more elements, processes, and/or devices in addition to, or instead of, those illustrated in FIG. 1, and/or may include more than one of any or all of the illustrated elements, processes, and devices.

Flowchart(s) representative of example machine-readable instructions, which may be executed by programmable circuitry to implement and/or instantiate the one or more endpoint devices 102 of FIG. 1 and/or the cloud network 106 of FIG. 1 and/or representative of example operations which may be performed by programmable circuitry to implement and/or instantiate the one or more endpoint devices 102 of FIG. 1 and/or the cloud network 106 of FIG. 1, are shown in FIGS. 4 and 5, respectively. The machine-readable instructions may be one or more executable programs or portion(s) of one or more executable programs for execution by programmable circuitry such as the programmable circuitry 612 shown in the example programmable circuitry platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums.

Further, although the example program is described with reference to the flowchart(s) illustrated in FIGS. 4 and 5, many other methods of implementing the one or more example endpoint devices 102 and/or the example cloud network 106 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine-executable instructions. For example, the machine-readable instructions may be fragmented and stored on one or more storage devices, disks, and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable, and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and 5 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic, and/or electrical) hardware to retain information for a time period, but to exclude propagating signals and to exclude transmission media. Examples of non-transitory computer-readable storage devices and/ or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

FIG. 4 is a flowchart representative of example machine-readable instructions and/or example operations 400 that may be executed, instantiated, and/or performed by example programmable circuitry to implement the one or more endpoint devices 102 of FIG. 1. The example machine-readable instructions and/or the example operations 400 of FIG. 4 begin at block 402, at which the endpoint agent 128 detects that a user of an endpoint device has navigated to a webpage that is unclassified. For example, the endpoint agent 128 can communicate with the cloud network 106 via a backend API to determine if a webpage visited by the endpoint device is classified or unclassified.

In the illustrated example of FIG. 4, for a webpage that is unclassified, the endpoint agent 128 captures a sample of the webpage at block 404. For example, the endpoint agent 128 captures a screenshot of the webpage. In some examples, the endpoint agent 128 scrapes text from the webpage. Additionally or alternatively, the endpoint agent 128 communicates with the backend of a web browser on the endpoint device to collect information from the webpage.

In the illustrated example of FIG. 4, at block 406, the endpoint agent 128 encodes the sample into an LSR (e.g., a latent space representation). At block 408, the endpoint agent 128 causes transmission of the LSR of the sample to a network device. For example, the endpoint agent 128 causes the first interface circuitry 108 to transmit the LSR of the sample to a network device of the cloud network 106. As described above, in some examples, the endpoint agent 128 also causes transmission of a pointer (e.g., URL) to the webpage to a network device.

In the illustrated example of FIG. 4, at block 410, based on a first communication (e.g., from the cloud network 106), the endpoint agent 128 performs an action to secure the endpoint device while classification of the webpage as malicious is verified. In the example of FIG. 4, the first communication indicates that the webpage was preliminarily classified as malicious (e.g., potentially malicious) and that the classification of the webpage is being verified by a subsequent classification. In some examples, at block 410, the endpoint agent 128 causes the endpoint device (e.g., a display of the endpoint device) to present (e.g., display) a warning (e.g., a message) to a user of the endpoint device that the webpage may be malicious.

Additionally or alternatively, at block 410, the endpoint agent 128 causes the endpoint device to prohibit entry of data (e.g., block entry of data) into the webpage (e.g., into a field of the webpage). In some examples, at block 410, the endpoint agent 128 causes the endpoint device to temporarily block (e.g., prevent) access to the webpage. Additionally or alternatively, at block 410, the endpoint agent 128 prohibits (e.g., blocks) entry of data into the endpoint device.

In the illustrated example of FIG. 4, at block 412, based on a second communication (e.g., from the cloud network 106), the endpoint agent 128 at least one of prohibits or permits access by the endpoint device to the webpage. For example, if the second communication indicates that the webpage was classified as malicious upon subsequent classification, then the endpoint agent 128 causes the endpoint device to block (e.g., prevent) access to the webpage. In some examples, if the second communication indicates that the webpage was classified as benign upon subsequent classification, then the endpoint agent 128 permits access by the endpoint device to the webpage.

FIG. 5 is a flowchart representative of example machine-readable instructions and/or example operations 500 that may be executed, instantiated, and/or performed by example programmable circuitry to implement the cloud network 106 of FIG. 1. The example machine-readable instructions and/or the example operations 500 of FIG. 5 begin at block 502, at which the cloud network 106 accesses, with a first AI model, a latent space representation of a first sample of a webpage. For example, at block 502, the low-resolution AI model 130 accesses a latent space representation of a first sample of a webpage (e.g., a first sample of data).

In the illustrated example of FIG. 5, at block 504, the cloud network 106 initiates the first AI model to classify the webpage as benign or potentially malicious based on the latent space representation. For example, at block 504, the low-resolution AI model 130 processes the LSR to classify the webpage as benign or potentially malicious. At block 506, the cloud network 106 determines whether the webpage was classified as potentially malicious. For example, at block 506, the low-resolution AI model 130 determines whether the webpage was classified as potentially malicious.

In the illustrated example of FIG. 5, based on (e.g., in response to) the cloud network 106 determining that the webpage was classified as potentially malicious (block 506: YES), the machine-readable instructions and/or the operations 500 proceed to block 508. Based on (e.g., in response to) the cloud network 106 determining that the webpage was not classified as potentially malicious (block 506: NO), the machine-readable instructions and/or the operations 500 terminate. At block 508, the cloud network 106 causes transmission of a first communication to cause an endpoint device (e.g., that accessed the webpage) to perform a security action while a classification of the webpage is verified. For example, at block 508, the low-resolution AI model 130 causes the second interface circuitry 120 to transmit a first communication to cause the endpoint device to perform a security action.

In the illustrated example of FIG. 5, a security action includes at least one of causing the endpoint device (e.g., a display of the endpoint device) to present (e.g., display) a warning (e.g., a message) to a user of the endpoint device that the webpage may be malicious, causing the endpoint device to prohibit (e.g., block) entry of data into the webpage (e.g., into a field of the webpage), causing the endpoint device to temporarily block (e.g., prevent) access to the webpage, and/or prohibiting (e.g., blocking) entry of data into the endpoint device. In the example of FIG. 5, at block 510, the cloud network 106 adds, with the first AI model, a pointer to the webpage to a queue for further analysis by a second AI model. For example, at block 510, the low-resolution AI model 130 adds a pointer to the webpage to the suspect queue 114 for further analysis by the high-resolution AI model 132.

In the illustrated example of FIG. 5, at block 512, the cloud network 106 causes scraping of data from the webpage to collect a second sample of the webpage. For example, at block 512, the web crawler 116 scrapes data from (e.g., takes a screenshot of, scrapes text from, etc.) the webpage to collect a second sample. At block 514, the cloud network 106 initiates the second AI model to classify the webpage as benign or malicious based on the second sample. For example, at block 514, after the first AI model classifies the webpage as potentially malicious, the high-resolution AI model 132 processes the second sample to classify the webpage as benign or malicious.

In the illustrated example of FIG. 5, at block 516, the cloud network 106 determines whether the webpage was classified as malicious. For example, at block 516, the high-resolution AI model 132 determines whether the webpage was classified as malicious. Based on (e.g., in response to) the cloud network 106 determining that the webpage was classified as malicious (block 516: YES), the machine-readable instructions and/or the operations 500 proceed to block 518. Based on (e.g., in response to) the cloud network 106 determining that the webpage was not classified as malicious (block 516: NO), the machine-readable instructions and/or the operations 500 proceed to block 522.

In the illustrated example of FIG. 5, at block 518, the cloud network 106 updates a reputation for the webpage to be malicious. For example, at block 518, the high-resolution AI model 132 updates the reputation for the webpage to be malicious. In the example of FIG. 5, at block 520, the cloud network 106 causes transmission of a second communication to cause the endpoint device to prohibit access to the webpage. For example, at block 520, the high-resolution AI model 132 causes the third interface circuitry 124 to transmit the second communication to cause the endpoint device to prohibit access (e.g., block access) by the endpoint device to the webpage.

In the illustrated example of FIG. 5, at block 522, the cloud network 106 updates a reputation for the webpage to be benign. For example, at block 522, the high-resolution AI model 132 updates the reputation for the webpage to be benign. In the example of FIG. 5, at block 524, the cloud network 106 causes transmission of a third communication to cause the endpoint device to permit access to the webpage. For example, at block 524, the high-resolution AI model 132 causes the third interface circuitry 124 to transmit the third communication to cause the endpoint device to permit access by the endpoint device to the webpage.

Figure 6:
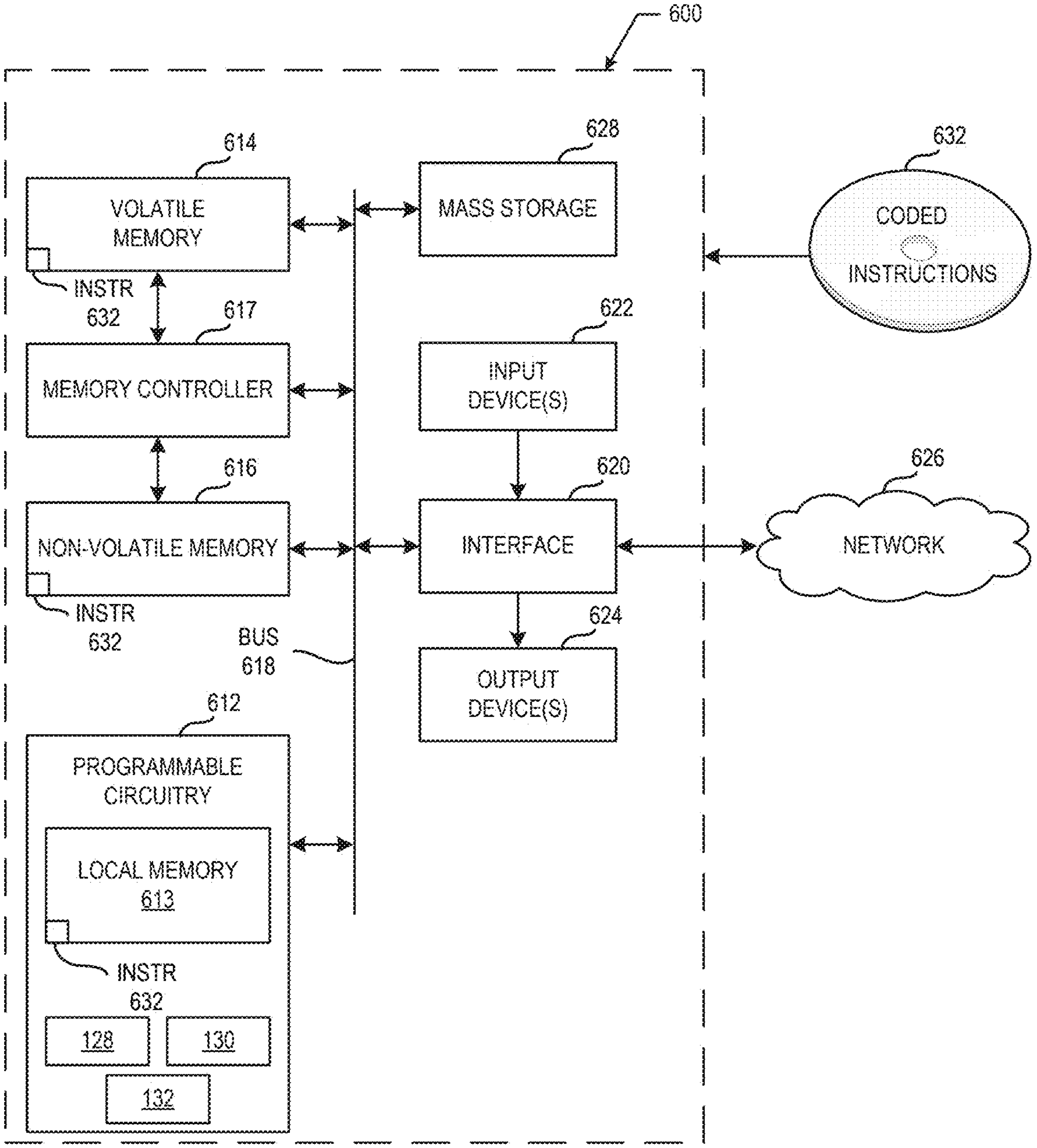
FIG. 6 is a block diagram of an example processing platform including programmable circuitry structured to execute, instantiate, and/or perform the example machine-readable instructions and/or perform the example operations of FIGS. 4 and/or 5 to implement the one or more endpoint devices and/or the cloud network of FIG. 1.

FIG. 6 is a block diagram of an example programmable circuitry platform 600 structured to execute and/or instantiate the example machine-readable instructions and/or the example operations of FIGS. 4 and/or 5 to implement the one or more endpoint devices 102 and/or the cloud network 106 of FIG. 1. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example endpoint agent 128, the example low-resolution AI model 130, and/or the example high-resolution AI model 132.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 632, which may be implemented by the machine-readable instructions of FIGS. 4 and/or 5, may be stored in the mass storage device 628, in the volatile memory 614, in the non-volatile memory 616, and/or on at least one non-transitory computer-readable storage medium such as a CD or DVD which may be removable.

Figure 7:
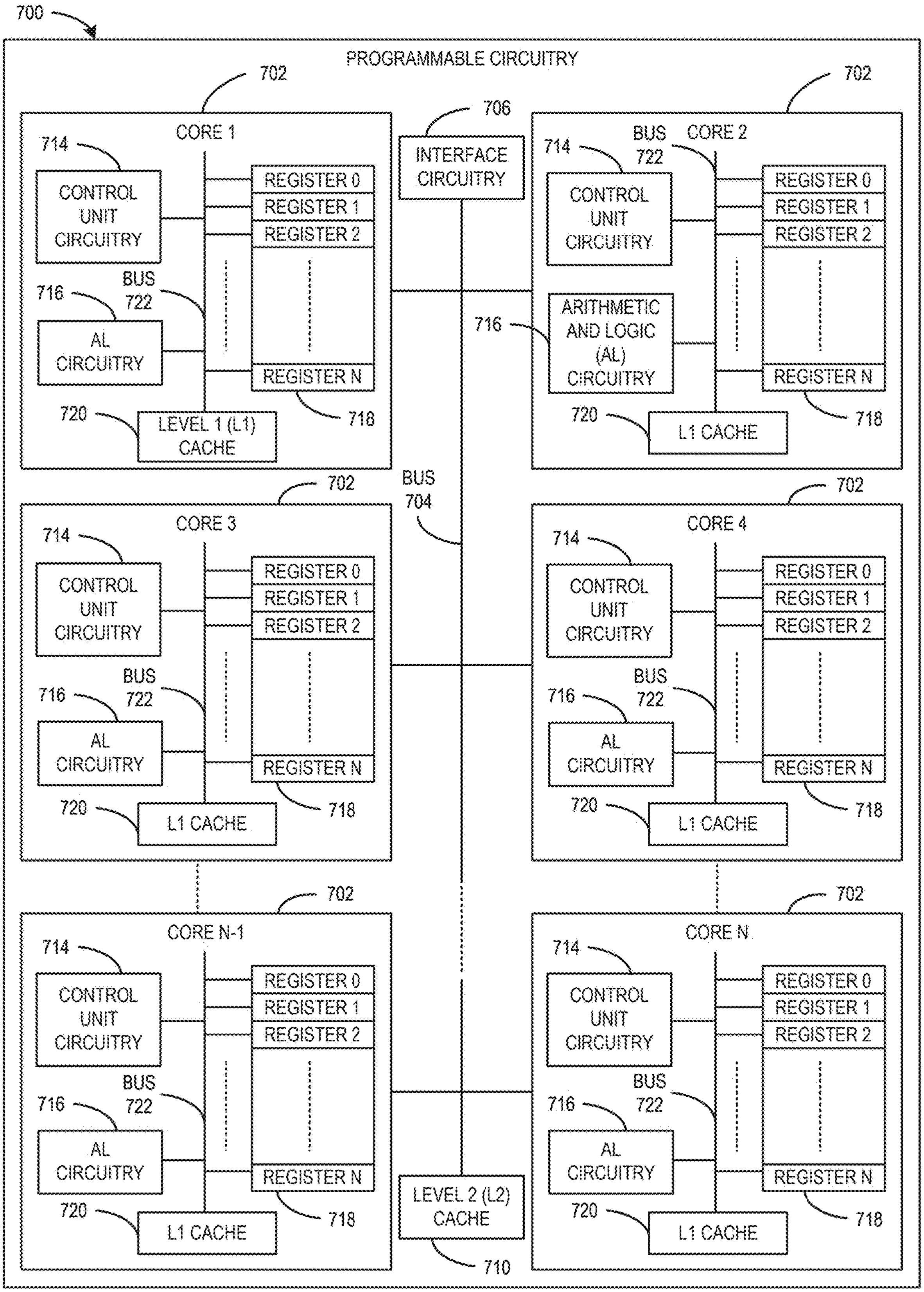
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowcharts of FIGS. 4 and/or 5 to effectively instantiate the circuitry of FIG. 1 as logic circuits to perform operations corresponding to those machine-readable instructions. In some such examples, the circuitry of FIG. 1 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc.

Although it may include any number of example cores 702 (e.g., 1 core), the microprocessor 700 of this example is a multi-core semiconductor device including N cores. The cores 702 of the microprocessor 700 may operate independently or may cooperate to execute machine-readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine-readable instructions and/or operations represented by the flowcharts of FIGS. 4 and/or 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry 716 (sometimes referred to as an ALU), a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer-based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7.

Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine-readable instructions. However, once configured, the FPGA circuitry 800 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine-readable instructions represented by the flowchart (s) of FIGS. 4 and/or 5 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 4 and/or 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4 and/or 5. As such, the FPGA circuitry 800 may be configured and/or structured to effectively instantiate some or all of the operations/functions corresponding to the machine-readable instructions of the flowchart(s) of FIGS. 4 and/or 5 as dedicated logic circuits to perform the operations/functions corresponding to those software instructions in a dedicated manner analogous to an ASIC. Therefore, the FPGA circuitry 800 may perform the operations/functions corresponding to the some or all of the machine-readable instructions of FIGS. 4 and/or 5 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine-readable instructions of FIGS. 4 and/or 5 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7.

Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine-readable instructions represented by the flowchart(s) of FIGS. 4 and/or 5 to perform first operation(s)/function(s), the FPGA circuitry 800 of FIG. 8 may be configured and/or structured to perform second operation(s)/function(s) corresponding to a second portion of the machine-readable instructions represented by the flowcharts of FIGS. 4 and/or 5, and/or an ASIC may be configured and/or structured to perform third operation(s)/function(s) corresponding to a third portion of the machine-readable instructions represented by the flowcharts of FIGS. 4 and/or 5.

It should be understood that some or all of the circuitry of FIG. 1 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 700 of FIG. 7 may execute machine-readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 1 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
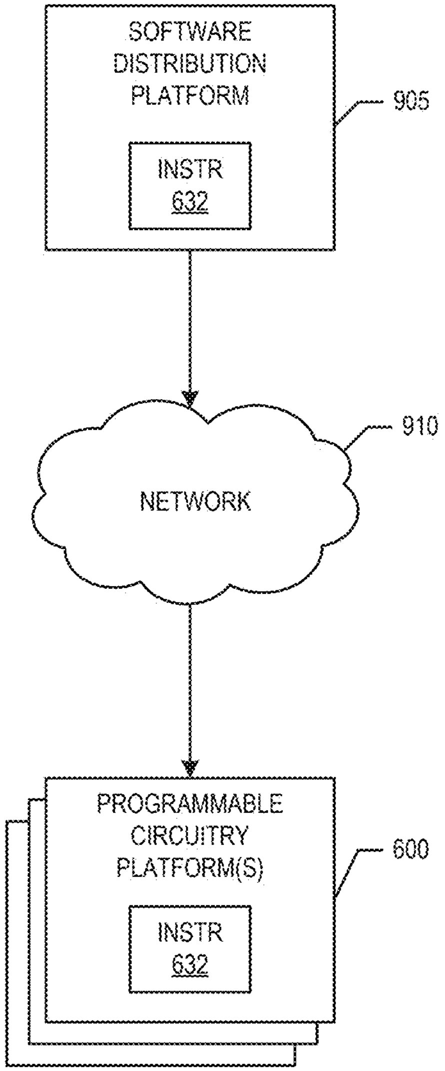
FIG. 9 is a block diagram of an example software/firmware/instructions distribution platform (e.g., one or more servers) to distribute software, instructions, and/or firmware (e.g., corresponding to the example machine-readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine-readable instructions 632 of FIG. 6 to other hardware devices (e.g., hardware devices owned and/or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine-readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine-readable instructions 632, which may correspond to the example machine-readable instructions of FIGS. 4 and/or 5, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 632 from the software distribution platform 905. For example, the software, which may correspond to the example machine-readable instructions of FIGS. 4 and/or 5, may be downloaded to the example programmable circuitry platform 600, which is to execute the machine-readable instructions 632 to implement the one or more endpoint devices 102 and/or the cloud network 106. In some examples, one or more servers of the software distribution platform 905 periodically offer, transmit, and/or force updates to the software (e.g., the example machine-readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein "real-time" refers to occurrence in a near instantaneous manner recognizing there may be real world delays for computing time, transmission, etc. Thus, unless otherwise specified, "real-time" refers to real time+1-5 seconds.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed to classify data via a tiered machine learning analysis. For example, examples disclosed herein include a hybrid AI system to efficiently classify web content while preserving PII. As such, end-user browsing data can be scanned without the risk of inadvertently disclosing end-user PII.

Example systems, apparatus, articles of manufacture, and methods have been disclosed that preserve privacy, reduce operational cost, allow for scalability, and/or preserve privacy. Examples disclosed herein improve the efficiency of using a computing device by preserving privacy, reducing performance impacts on an endpoint device and/or the cloud, improving updatability of an AI model, and/or reducing the computational cost of implementing the AI model which increases the scalability of the AI model. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to classify data via tiered machine learning analysis are disclosed herein. Further examples and combinations thereof include the following:

Example 1 includes an apparatus comprising interface circuitry to access a latent space representation (LSR) of a first sample of a webpage, machine-readable instructions, and at least one processor circuit to be programmed by the machine-readable instructions to initiate a first artificial intelligence (AI) model to classify the webpage as benign or potentially malicious based on the LSR, and after the first AI model classifies the webpage as potentially malicious, initiate a second AI model to classify the webpage as benign or malicious based on a second sample of the webpage, the first AI model being less precise than the second AI model.

Example 2 includes the apparatus of example 1, wherein one or more of the at least one processor circuit is to cause storage of a pointer to the webpage in a queue accessible by a web crawler after the first AI model classifies the webpage as potentially malicious.

Example 3 includes the apparatus of any of examples 1 or 2, wherein one or more of the at least one processor circuit is to cause scraping of data from the webpage to collect the second sample after the first AI model classifies the webpage as potentially malicious.

Example 4 includes the apparatus of any of examples 1, 2, or 3, wherein one or more of the at least one processor circuit is to at least one of (a) cause an endpoint device to present a warning to a user of the endpoint device that the webpage may be malicious or (b) cause the endpoint device to prohibit entry of data into the webpage.

Example 5 includes the apparatus of any of examples 1, 2, or 3, wherein one or more of the at least one processor circuit is to cause an endpoint device to block access to the webpage.

Example 6 includes the apparatus of any of examples 1, 2, or 3, wherein the LSR obfuscates personally identifiable information of a user that accessed the webpage with an endpoint device.

Example 7 includes the apparatus of any of examples 1, 2, 3, 4, 5, or 6, wherein the first AI model has high recall and low precision, and the second AI model has high recall and high precision.

Example 8 includes a non-transitory computer-readable medium comprising instruction to cause at least one processor circuit to initiate a first artificial intelligence (AI) model to classify a webpage as benign or potentially malicious based on a latent space representation of a first sample of the webpage, and after the first AI model classifies the webpage as potentially malicious, initiate a second AI model to classify the webpage as benign or malicious based on a second sample of the webpage, the first AI model being less precise than the second AI model.

Example 9 includes the non-transitory computer-readable medium of example 8, wherein the instructions cause one or more of the at least one processor circuit to cause storage of an identifier of the webpage in a queue accessible by a web crawler after the first AI model classifies the webpage as potentially malicious.

Example 10 includes the non-transitory computer-readable medium of any of examples 8 or 9, wherein the instructions cause one or more of the at least one processor circuit to cause scraping of data from the webpage to collect the second sample after the first AI model classifies the webpage as potentially malicious.

Example 11 includes the non-transitory computer-readable medium of any of examples 8, 9, or 10, wherein the instructions cause one or more of the at least one processor circuit to at least one of (a) cause an endpoint device to display a message to a user of the endpoint device that the webpage may be malicious or (b) cause the endpoint device to block entry of data into the webpage.

Example 12 includes the non-transitory computer-readable medium of any of examples 8, 9, or 10, wherein the instructions cause one or more of the at least one processor circuit to cause an endpoint device to prevent access to the webpage.

Example 13 includes the non-transitory computer-readable medium of any of examples 8, 9, or 10, wherein the latent space representation removes personally identifiable information of a user from the first sample of the webpage.

Example 14 includes the non-transitory computer-readable medium of any of examples 8, 9, 10, 11, 12, or 13, wherein the first AI model has high recall and low precision, and the second AI model has high recall and high precision.

Example 15 includes a system comprising an endpoint device including at least one first processor circuit to encode a first sample of data into a latent space representation (LSR), and first interface circuitry to transmit the LSR over a network, and a network device including second interface circuitry to access the LSR from the endpoint device, and at least one second processor circuit to initiate a first artificial intelligence (AI) model to classify the data as benign or potentially malicious based on the LSR, and after the first AI model classifies the data as potentially malicious, initiate a second AI model to classify the data as benign or malicious based on a second sample of the data, the first AI model being less precise than the second AI model.

Example 16 includes the system of example 15, wherein one or more of the at least one second processor circuit is to cause storage of a pointer to the data in a queue accessible by a web crawler after the first AI model classifies the data as potentially malicious.

Example 17 includes the system of any of examples 15 or 16, wherein one or more of the at least one second processor circuit is to cause scraping of a webpage to collect the second sample after the first AI model classifies the webpage as potentially malicious.

Example 18 includes the system of any of examples 15, 16, or 17, wherein the data is first data, and one or more of the at least one first processor circuit is to, based on a communication from the network device, at least one of (a) cause a display of the endpoint device to present a warning to a user of the endpoint device that the first data may be malicious or (b) block entry of second data into a field associated with the first data.

Example 19 includes the system of any of examples 15, 16, or 17, wherein one or more of the at least one second processor circuit is to prevent access to the data based on a communication from the network device.

Example 20 includes the system of any of examples 15, 16, 17, 18, or 19, wherein the first AI model has high recall and low precision, and the second AI model has high recall and high precision.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

interface circuitry to access a latent space representation (LSR) of a first sample of an unclassified webpage via a network, the LSR being an image of the unclassified webpage that obfuscates personally identifiable information (PII) of a user that accessed the unclassified webpage with an endpoint device;

machine-readable instructions; and at least one processor circuit to be programmed by the machine-readable instructions to:

initiate a first artificial intelligence (AI) model to classify the unclassified webpage as benign or potentially malicious based on the LSR, the first AI model trained on LSRs of first webpages that are labelled as benign or malicious; and after the first AI model classifies the unclassified webpage as potentially malicious, initiate a second AI model to classify the unclassified webpage as benign or malicious based on a second sample of the unclassified webpage, the second sample being a non-obfuscated sample of the unclassified webpage, the second AI model trained on non-obfuscated samples of second webpages that are labelled as benign or malicious, the first AI model being less precise than the second AI model.

2. The apparatus of claim 1, wherein one or more of the at least one processor circuit is to cause storage of a pointer to the unclassified webpage in a queue accessible by a web crawler after the first AI model classifies the unclassified webpage as potentially malicious.

3. The apparatus of claim 1, wherein one or more of the at least one processor circuit is to cause scraping of data from the unclassified webpage to collect the second sample after the first AI model classifies the unclassified webpage as potentially malicious.

4. The apparatus of claim 1, wherein one or more of the at least one processor circuit is to at least one of (a) cause the endpoint device to present a warning to the user of the endpoint device that the unclassified webpage may be malicious or (b) cause the endpoint device to prohibit entry of data into the unclassified webpage.

5. The apparatus of claim 1, wherein one or more of the at least one processor circuit is to cause the endpoint device to block access to the unclassified webpage.

6. The apparatus of claim 1, wherein the first AI model has high recall and low precision, and the second AI model has high recall and high precision.

7. The apparatus of claim 1, wherein a data size of consecutive LSRs from the endpoint device is fixed.

8. The apparatus of claim 1, wherein the LSR preserves structural features of the unclassified webpage and obfuscates the PII of the user.

9. A non-transitory computer-readable medium comprising instruction to cause at least one processor circuit to:

initiate a first artificial intelligence (AI) model to classify an unclassified webpage as benign or potentially malicious based on a latent space representation (LSR) of a first sample of the unclassified webpage, the LSR being an image of the unclassified webpage that obfuscates personally identifiable information (PII) of a user that accessed the unclassified webpage with an endpoint device, the first AI model trained on LSRs of first webpages that are labelled as benign or malicious; and after the first AI model classifies the unclassified webpage as potentially malicious, initiate a second AI model to classify the unclassified webpage as benign or malicious based on a second sample of the unclassified webpage, the second sample being a non-obfuscated sample of the unclassified webpage, the second AI model trained on non-obfuscated samples of second webpages that are labelled as benign or malicious, the first AI model being less precise than the second AI model.

10. The non-transitory computer-readable medium of claim 9, wherein the instructions cause one or more of the at least one processor circuit to cause storage of an identifier of the unclassified webpage in a queue accessible by a web crawler after the first AI model classifies the unclassified webpage as potentially malicious.

11. The non-transitory computer-readable medium of claim 9, wherein the instructions cause one or more of the at least one processor circuit to cause scraping of data from the unclassified webpage to collect the second sample after the first AI model classifies the unclassified webpage as potentially malicious.

12. The non-transitory computer-readable medium of claim 9, wherein the instructions cause one or more of the at least one processor circuit to at least one of (a) cause the endpoint device to display a message to the user of the endpoint device that the unclassified webpage may be malicious or (b) cause the endpoint device to block entry of data into the unclassified webpage.

13. The non-transitory computer-readable medium of claim 9, wherein the instructions cause one or more of the at least one processor circuit to cause the endpoint device to prevent access to the unclassified webpage.

14. The non-transitory computer-readable medium of claim 9, wherein a data size of consecutive LSRs from the endpoint device is fixed.

15. A system comprising:

an endpoint device including:

at least one first processor circuit to encode a first sample of unclassified data into a latent space representation (LSR), the LSR being an image of the unclassified data that obfuscates personally identifiable information (PII) of a user that accessed the unclassified data; and first interface circuitry to transmit the LSR over a network; and a network device including:

second interface circuitry to access the LSR from the endpoint device; and at least one second processor circuit to:

initiate a first artificial intelligence (AI) model to classify the unclassified data as benign or potentially malicious based on the LSR, the first AI model trained on LSRs of first webpages that are labelled as benign or malicious; and after the first AI model classifies the unclassified data as potentially malicious, initiate a second AI model to classify the unclassified data as benign or malicious based on a second sample of the unclassified data, the second sample being a non-obfuscated sample of the unclassified data, the second AI model trained on non-obfuscated samples of second webpages that are labelled as benign or malicious, the first AI model being less precise than the second AI model.

16. The system of claim 15, wherein one or more of the at least one second processor circuit is to cause storage of a pointer to the unclassified data in a queue accessible by a web crawler after the first AI model classifies the unclassified data as potentially malicious.

17. The system of claim 15, wherein one or more of the at least one second processor circuit is to cause scraping of a webpage to collect the second sample after the first AI model classifies the webpage as potentially malicious.

18. The system of claim 15, wherein the unclassified data is first unclassified data, and one or more of the at least one first processor circuit is to, based on a communication from the network device, at least one of (a) cause a display of the endpoint device to present a warning to the user of the endpoint device that the first unclassified data may be malicious or (b) block entry of second data into a field associated with the first unclassified data.

19. The system of claim 15, wherein one or more of the at least one second processor circuit is to prevent access to the unclassified data based on a communication from the network device.

20. The system of claim 15, wherein the first AI model has high recall and low precision, and the second AI model has high recall and high precision.

* * * * *